(12) United States Patent
Mungara et al.

(10) Patent No.: US 12,101,141 B2
(45) Date of Patent: Sep. 24, 2024

(54) BROADCAST AND MULTICAST TRANSMISSION IN A DISTRIBUTED MASSIVE MIMO NETWORK

(71) Applicant: TELEFONAKTIEBOLAGET LM ERICSSON (PUBL), Stockholm (SE)

(72) Inventors: Ratheesh Kumar Mungara, Sundbyberg (SE); Pål Frenger, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/613,668

(22) PCT Filed: May 25, 2020

(86) PCT No.: PCT/EP2020/064466
§ 371 (c)(1),
(2) Date: Nov. 23, 2021

(87) PCT Pub. No.: WO2020/234486
PCT Pub. Date: Nov. 26, 2020

(65) Prior Publication Data
US 2022/0321179 A1 Oct. 6, 2022

Related U.S. Application Data

(60) Provisional application No. 62/851,951, filed on May 23, 2019.

(51) Int. Cl.
*H04B 7/0452* (2017.01)
*H04B 7/024* (2017.01)
(Continued)

(52) U.S. Cl.
CPC .......... *H04B 7/0452* (2013.01); *H04B 7/024* (2013.01); *H04B 7/0626* (2013.01); *H04B 7/0634* (2013.01); *H04W 4/06* (2013.01)

(58) Field of Classification Search
CPC ... H04B 1/04; H04B 7/02; H04B 7/04; H04B 7/06; H04B 7/024; H04B 7/0452;
(Continued)

(56) References Cited

U.S. PATENT DOCUMENTS

2015/0270882 A1    9/2015  Shattil
2018/0294850 A1*  10/2018  Frenger ............... H04B 7/0617

FOREIGN PATENT DOCUMENTS

WO    2018103897 A1    6/2018

* cited by examiner

*Primary Examiner* — Shawkat M Ali

(57) ABSTRACT

Systems and methods for broadcast/multicast transmission in a distributed cell-free massive Multiple Input Multiple Output (MIMO) network are disclosed. In one embodiment, a method for broadcasting/multicasting data to User Equipments (UEs) comprises, at each Access Point (AP) of two or more APs, obtaining long-term Channel State Information (CSI) for a UE(s) and communicating the long-term CSI for the UE to a central processing system. The method further comprises, at the central processing system, receiving the long-term CSI for the UE from each AP, computing a precoding vector (w) for the UE(s) across the APs based on the long-term CSI, and communicating the precoding vector (w) to the APs. The method further comprises, at each AP, obtaining the precoding vector (w) from the central processing system, precoding data to be broadcast/multicast to the UE(s) based on the precoding vector (w), and broadcasting/multicasting the precoded data to the UE(s).

14 Claims, 15 Drawing Sheets

Distributed Massive MIMO Architecture

(51) Int. Cl.
*H04B 7/06* (2006.01)
*H04W 4/06* (2009.01)

(58) Field of Classification Search
CPC .. H04B 7/0456; H04B 7/0626; H04B 7/0634;
H04L 5/00; H04L 25/02; H04L 27/20;
H04W 4/00; H04W 4/06; H04W 52/00;
H04W 52/34; H04W 72/02; H04W
724/04
USPC ........ 370/252, 311, 328; 375/219, 260, 267,
375/295, 316; 455/450, 501, 509
See application file for complete search history.

Centralized Massive MIMO Architecture

Distributed Massive MIMO Architecture

By using, e.g., conjugate beamforming, the beamforming processing required can be performed per-element (or per group of elements, not shown in this figure)

Cumulative distributions of local-average SINR for K = 4 users and M = 64 APs. In each NW realization, APs and users are placed in random locations Cumulative distributions of local-average SINR for K = 4 users and M = 55 APs. The users are placed in random locations in each NW realization while the APs are placed in fixed locations according to hexagonal layout D-maMIMO NW operation for broadcasting data

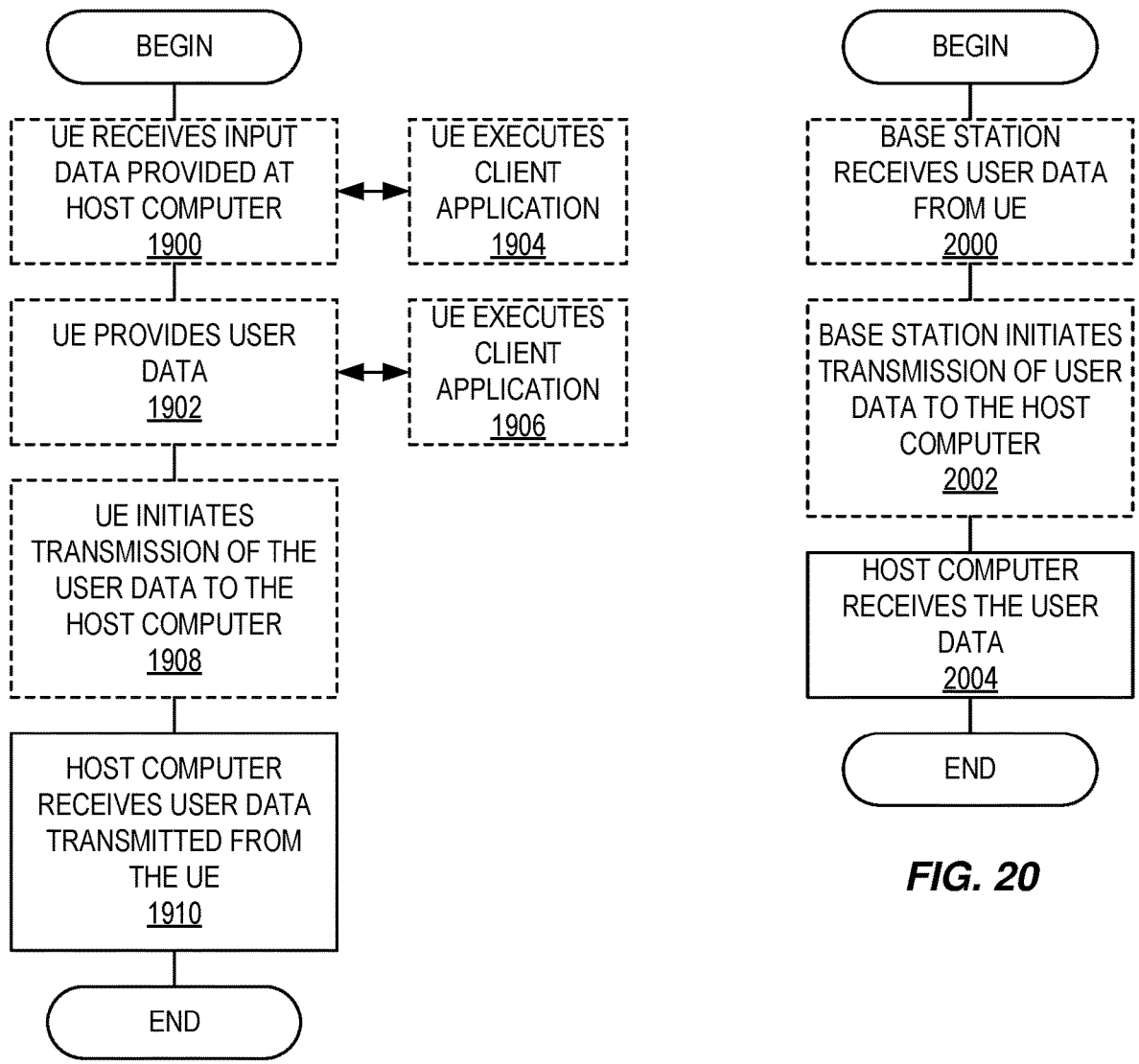

BROADCAST AND MULTICAST TRANSMISSION IN A DISTRIBUTED MASSIVE MIMO NETWORK

RELATED APPLICATIONS

This application is a national stage application of International Patent Application No. PCT/EP2020/064466, filed May 25, 2020, which claims the benefit of U.S. Provisional Application No. 62/851,951, filed May 23, 2019, the disclosures of which are incorporated in their entirety by reference.

TECHNICAL FIELD

The present disclosure relates to a Distributed Massive Multiple Input Multiple Output (DM-MIMO) system and, in particular, to broadcast or multicast transmission in a DM-MIMO system.

BACKGROUND

Massive Multiple Input Multiple Output (MIMO), which is also known as large-scale antenna systems and very large MIMO, is a multi-user MIMO technology where each base station is equipped with a large number of antenna elements (typically more than 50), which are being used to serve many terminals that share the same time and frequency band and are separated in the spatial domain. A key assumption is that there are many more base station antennas than terminals—at least twice as many, but ideally as many as possible. Massive MIMO offers many benefits over conventional multi-user MIMO. First, conventional multi-user MIMO is not a scalable technology since it has been designed to support systems with roughly equal numbers of service antennas and terminals, and practical implementations of conventional multi-user MIMO typically relies on Frequency Division Duplexing (FDD) operation. By contrast, in massive MIMO, the large excess of service antennas over active terminals operating in Time Division Duplexing (TDD) brings large improvements in throughput and radiated energy efficiency. These benefits result from the strong spatial multiplexing achieved by appropriately shaping the signals sent out and received by the base station antennas. By applying precoding to all antennas, the base station can ensure constructive interference among signals at the locations of the intended terminals, and destructive interference almost everywhere else. Furthermore, as the number of antennas increases, the energy can be focused with extreme precision into small regions in space. Other benefits of massive MIMO include use of simple low-power components since it relies on simple signal processing techniques, reduced latency, and robustness against intentional jamming.

When operating in TDD mode, massive MIMO can exploit the channel reciprocity property, according to which the channel responses are the same in both uplink and downlink. Channel reciprocity allows the base stations to acquire Channel State Information (CSI) from pilot sequences transmitted by the terminals in the uplink, and this CSI is then useful for both the uplink and the downlink. By the law of large numbers, the effective scalar channel gain seen by each terminal is close to a deterministic constant. This is called channel hardening. Thanks to the channel hardening, the terminals can reliably decode the downlink data using only long-term statistical CSI, making the most of the physical layer control signaling redundant, i.e. low-cost CSI acquisition. This renders the conventional resource allocation concepts unnecessary and results in a simplification of the Medium Access Control (MAC) layer. These benefits explain why massive MIMO has a central position in Fifth Generation (5G).

However, massive MIMO system performances are affected by some limiting factors. Channel reciprocity requires hardware calibration. In addition, the so-called pilot contamination effect is a basic phenomenon which profoundly limits the performance of massive MIMO systems. Theoretically, every terminal in a massive MIMO system could be assigned an orthogonal uplink pilot sequence. However, the maximum number of orthogonal pilot sequences that can exist is upper-bounded by the size of the coherence interval, which is the product of the coherence time and coherence bandwidth. Hence, adopting orthogonal pilots leads to inefficient resource allocation as the number of the terminals increases, or it is not physically possible to perform when the coherence interval is too short. As a consequence, pilots must be reused across cells, or even within the home cell (for higher cell density). This inevitably causes interference among terminals which share the same pilot. Pilot contamination does not vanish as the number of base station antennas grows large, and so it is the one impairment that remains asymptotically.

To implement massive MIMO in wireless networks, two different architectures can be adopted:
  Centralized Massive MIMO (C-maMIMO), where all the antennas are co-located in a compact area at both the base station and user sides, as shown in FIG. 1. It represents the conventional massive MIMO system.
  Distributed Massive MIMO (D-maMIMO), where base station antennas, herein named Access Points (APs), are geographically spread out over a large area in a well-planned or random fashion, as shown in FIG. 2. Antennas are connected together and to a Central Processing Unit (CPU) through high-capacity backhaul links (e.g., fiber optic cables). It is also known as a cell-free massive MIMO system.

D-maMIMO architecture is one important enabler of network MIMO in future standards. Network MIMO is a terminology that is used for a cell-free wireless network, where all the base stations that are deployed over the coverage area act as a single base station with distributed antennas. This can be considered the ideal network infrastructure from a performance perspective, since the network has great abilities to spatially multiplex users and exactly control the interference that is caused to everyone.

The distinction between D-maMIMO and conventional distributed MIMO is the number of antennas involved in coherently serving a given user. In D-maMIMO, every antenna serves every user. Compared to C-maMIMO, D-maMIMO has the potential to improve both the network coverage and the energy efficiency due to increased macro-diversity gain. This comes at the price of higher fronthaul requirements and the need for distributed signal processing. In D-maMIMO, the information regarding payload data and power control coefficients is exchanged via the backhaul network between the APs and the CPU. There is no exchange of instantaneous CSI among the APs or the central unit, i.e., CSI acquisition can be performed locally at each AP.

Due to network topology, D-maMIMO suffers from different degrees of path losses caused by different access distances to different distributed antennas, and very different shadowing phenomena that are not necessarily better (e.g., antennas deployed at the street level are more easily blocked by buildings than antennas deployed at elevated locations). Moreover, since the location of antennas in D-maMIMO has a significant effect on the system performance, optimization of the antenna locations is crucial. In addition, the D-maMIMO system potentially suffers a low degree of channel hardening. As mentioned earlier, the channel hardening property is key in massive MIMO to suppress small-scale fading and derives from the large number of antennas involved in a coherent transmission. In D-maMIMO, APs are distributed over a wide area, and many APs are very far from a given user. Therefore, each user is effectively served by a smaller number of APs. As a result, channel hardening might be less pronounced. This would considerably affect the system performance.

The performance of any wireless network is clearly the availability of good enough CSI to facilitate phase-coherent processing at multiple antennas. Intuitively, acquiring high quality CSI should be easier with a C-maMIMO than in a D-maMIMO where the antennas are distributed over a large geographical area. Nevertheless, the macro-diversity gain has a dominant importance and leads to improved coverage and energy efficiency.

A problem with a massive MIMO deployment is that a large number of antennas generate a large amount of data. This implies that, with traditional radio to antenna interfaces, very large capacity fiber networks are needed to shuffle this data around. Fiber is both expensive and needs skilled personnel for installation, both of which limit the deployment scenarios for massive MIMO. There is also a scalability issue as different size baseband units are needed to handle different array sizes, e.g. one to handle 32 antennas, another one for 128 antennas, etc.

From a practical point of view, a C-maMIMO solution where all antenna elements (i.e., APs) are placed close together has a number of drawbacks compared to a D-maMIMO solution where the antenna elements are distributed over a larger area. These are, e.g.:

Very large service variations: User Equipment devices (UEs) that happen to be located close to the central massive MIMO node will experience very good service quality while for UEs further away the service quality will degrade rapidly.

Sensitive to blocking: On high frequency bands in particular the signal is easily blocked by obstacles that obscure the line-of-sight between the UE and the C-maMIMO node. In D-maMIMO, a number of antenna elements may be blocked but it requires much larger obstacles to block all antenna elements High heat concentration: Due to heat concentration it is difficult to make C-maMIMO nodes very small. In D-maMIMO, each antenna element (and its associated processing) generates only a small amount of heat and this simplifies miniaturization.

Large and visible installations: C-maMIMO installations can become large, especially on lower frequency bands. D-maMIMO installations are actually even larger, but the visual impact can be made almost negligible.

Installation requires personnel with "radio skills": Installing a complex piece of hardware in a single location requires planning and most probably also proper installation by certified personnel. In a D-maMIMO installation it is less crucial that each and every one of the very many antenna elements is installed in a very good location. It is sufficient that the majority of the elements are installed in good enough locations. The requirements on installation can be significantly relaxed with a D-maMIMO deployment.

Power limited by regulations (e.g., Specific Absorption Rate (SAR)): If the antenna elements are located close together there will be an area close to the installation where electromagnetic wave safety rules apply. This is likely to put limits on the total radiated radio frequency power in many installations. In a D-maMIMO installation a user may come close to a small number of antenna elements, but it is impossible to be physically close to many elements that are distributed over a large area.

There are many significant benefits with D-maMIMO compared to C-maMIMO. However, the cabling and internal communication between antenna elements in a D-maMIMO is prohibiting in state-of-the art solutions. It is not economically feasible to connect a separate cable between each antenna element and a CPU (e.g., in a star topology) in a D-maMIMO installation. Either arbitrary or optimal AP topology may lead to a prohibitive cost for the backhaul component, as well as installation costs for distributing processing and settings.

The principle of "radio stripes" in was previously introduced in WO 2018/103897 A1, entitled IMPROVED ANTENNA ARRANGEMENT FOR DISTRIBUTED MASSIVE MIMO. The actual "base stations" in a "radio stripe system" may consist of circuit mounted chips inside a protective casing of a cable or a stripe. The receive and transmit processing of each antenna element is performed next to the actual antenna element itself. Since the total number of distributed antenna elements is assumed to be large (e.g., several hundred), the radio frequency transmit power of each antenna element is very low.

The example in FIG. 3 depicts a system mockup and shows a Light Emitting Diode (LED) lighting stripe connected to a box. This figure is only used to exemplify how the actual distributed massive MIMO base station could be built. A CPU (or stripe station) connects with one or more radio stripes (or distributed MIMO active antenna cables).

The actual radio stripes may contain tape or adhesive glue on the backside, as in the example of the LED stripes, or it may simply contain very small per-antenna processing units and antennas protected by the plastics covering the cable.

An important observation to make is that both the transmitter and receiver processing can be distributed under certain assumptions, e.g. see FIG. 4. With low-complexity precoding methods such as conjugate beamforming, each antenna element can be equipped with a controlling entity (Antenna Processing Unit (APU)) that determines the beamforming weights without communicating with all other APUs.

One area where distributed massive MIMO is of interest is on-demand broadcast and/or multicast transmissions in 5G New Radio (NR), over a certain region or complete coverage area. Existing Fourth Generation (4G) Long Term Evolution (LTE) systems support broadcast and multicast transmission over a wide area using either Single Frequency Network (SFN) or single-cell point-to-multipoint operating modes, under the current moniker of Multimedia Broadcast Multicast Service (MBMS). Specifically, in Multimedia Broadcast Multicast Service Single Frequency Network (MBSFN), base stations across multiple cells transmit the same data in the same resource block over special frames dedicated to MBMS service. Alternatively, in Single Cell Point to Multipoint (SC-PTM), the same data is transmitted to multiple users in a single cell using Physical Downlink Shared Channel (PDSCH). This is expected to soon be supported also in 5G NR access technology. However, the radio session establishment procedure of LTE MBMS is complex and time-consuming. In any of the above modes, MBMS requires a separate user plane infrastructure for connecting the Radio Access Network (RAN) with the core network. Furthermore, broadcast transmission in LTE is always an add-on feature with the above limitations. It is not straightforward to directly adapt LTE MBMS for 5G NR while simultaneously enabling fast and efficient radio sessions as well as joint unicast, broadcast, and multicast transmissions.

Depending on the application, low-rate and high-rate broadcast transmission may be needed with a guaranteed reliability. The first example includes broadcasting of signals during initial access operation for synchronization, system information, and paging, which must be transmitted over a wide area, but not necessarily with high-rate. In some situations, such as live events or in stadiums, a relatively high-rate data transmission may be needed, and there are no time or radio resources to acquire instantaneous or small-scale CSI by means of uplink reference signals before transmitting data to a UE.

Thus, there is a need for systems and methods for efficient use of beamforming, such as the open-loop transmission used in LTE or NR, in a network with a distributed massive MIMO deployment.

SUMMARY

Systems and methods for broadcast or multicast transmission in a distributed cell-free massive Multiple Input Multiple Output (MIMO) network are disclosed. In one embodiment, a method for broadcasting or multicasting data to User Equipments (UEs) in a distributed cell-free massive MIMO network comprises, at each Access Point (AP) of two or more APs, obtaining long-term Channel State Information (CSI) for at least one UE and communicating the long-term CSI for the at least one UE to a central processing system. The method further comprises, at the central processing system, for each AP of the two or more APs, receiving the long-term CSI for the at least one UE from the AP, computing a precoding vector (w) for the at least one UE across the two or more APs based on the long-term CSI for the at least one UE received from the two or more APs, and communicating the precoding vector (w) to the two or more APs. The method further comprises, at each AP of the two or more APs, obtaining the precoding vector (w) from the central processing system, precoding data to be broadcast or multicast to the at least one UE based on the precoding vector (w) and broadcasting or multicasting the precoded data to the at least one UE. In this manner, an efficient way of on-demand data broadcasting in distributed or cell-free massive MIMO network can be provided. Further, the reliability of the broadcasting/multicasting can be vastly improved. In addition, this scheme suitable for operating at both micro and millimeter-wave frequencies.

Embodiments of a method performed at a central processing system are also provided. In one embodiment, a method performed at a central processing system for a distributed cell-free massive MIMO network for broadcasting or multicasting data to UEs comprises, for each AP of two or more APs in the distributed cell-free massive MIMO network, receiving long-term Channel State Information (CSI) for at least one UE from the AP, computing a precoding vector (w) for the at least one UE across all of the two or more APs based on the long-term CSI for the at least one UE received from the two or more APs, and communicating the precoding vector (w) to the two or more APs.

In one embodiment, the at least one UE is two or more UEs.

In one embodiment, computing the precoding vector (w) comprises: (a) at iteration 0, initializing the precoding vector (w) to provide a precoding vector w(0) for iteration 0, (b) computing local-average Signal to Interference plus Noise Ratios (SINRs) of the at least one UE, (c) identifying a weakest UE from among the at least one UE based on the computed local-average SINRs, (d) at iteration n+1, updating the precoding vector (w) based on the long-term CSI obtained from the at least one UE for the weakest UE to thereby provide a precoding vector w(n+1) for iteration n+1, (e) normalizing the precoding vector w(n+1) for iteration n+1, and (f) repeating steps (b) through (e) until a stopping criterion is satisfied such that the normalized precoding vector for the last iteration is provided as the precoding vector (w). In one embodiment, the stopping criterion is convergence or maximum number of iterations has been reached.

In one embodiment, initializing the precoding vector (w) comprises initializing the precoding vector (w) to a value $$w(0) = \frac{1}{\sqrt{M}}[1, \ldots, 1]^T.$$

In one embodiment, computing the local SINRs of the at least one UE comprises computing the local SINRs of the at least one UE as $\gamma_k = Pw^*\Theta_k w$, $k=1, \ldots, K$, by means of $\Theta_k$. In one embodiment, identifying the weakest UE as the UE whose index k' is $$k' = \arg\min_{k=1,\ldots,K} \gamma_k.$$

In one embodiment, updating the precoding vector (w) comprises updating the precoding vector (w) at iteration n+1 as $w(n+1) = (I + \mu\Theta_{k'})w(n)$.

In one embodiment, normalizing the precoding vector w(n+1) for iteration n+1 comprises normalizing the precoding vector w(n+1) for iteration n+1 as $w(n+1) = w(n+1)/\|w(n+1)\|$.

In one embodiment, the long-term CSI comprises estimated path loss.

In one embodiment, a coherent interval of the long-term CSI spans greater than 1,000 symbols, and the method further comprises scheduling transmissions by the at least one UE (506) of a dedicated pilot.

Corresponding embodiments of a central processing system are also disclosed. In one embodiment, a central processing system for a distributed cell-free massive MIMO network for broadcasting or multicasting data to UEs is adapted to, for each AP of two or more APs in the distributed cell-free massive MIMO network, receive long-term CSI for at least one UE from the AP, compute a precoding vector (w) for the at least one UE across all of the two or more APs based on the long-term CSI for the at least one UE received from the two or more APs, and communicate the precoding vector (w) to the two or more APs.

In one embodiment, a central processing system for a distributed cell-free massive MIMO network for broadcasting or multicasting data to UEs comprises a network interface and processing circuitry associated with the network interface. The processing circuitry is configured to cause the central processing system to, for each AP of two or more APs in the distributed cell-free massive MIMO network, receive long-term CSI for at least one UE from the AP, compute a precoding vector (w) for the at least one UE across all of the two or more APs based on the long-term CSI for the at least one UE received from the two or more APs, and communicate the precoding vector (w) to the two or more APs.

Embodiments of a method performed at an AP are also disclosed. In one embodiment, a method performed at an AP in a distributed cell-free massive MIMO network for broadcasting or multi-casting data to UEs wherein the network comprises two or more APs, comprises obtaining long-term CSI for at least one UE, communicating the long-term CSI for the at least one UE to a central processing system, obtaining a precoding vector (w) from the central processing system where the precoding vector (w) is for the at least one UE across all of two or more APs, precoding data to be broadcast or multicast to the at least one UE based on the precoding vector (w), and broadcasting or multicasting the precoded data to the at least one UE.

In one embodiment, the at least one UE is two or more UEs.

In one embodiment, the long-term CSI comprises estimated path loss.

In one embodiment, a coherent interval of the long-term CSI spans greater than 1,000 symbols, and obtaining the long-term CSI for the at least one UE comprises estimating the long-term CSI for the at least one UE in fixed intervals of time, based on transmissions of a dedicated pilot by the at least one UE.

Corresponding embodiments of an AP are also disclosed. In one embodiment, an AP in a distributed cell-free massive MIMO network for broadcasting or multi-casting data to UEs wherein the network comprises two or more APs is provided, where the AP is adapted to obtain long-term CSI for at least one UE, communicate the long-term CSI for the at least one UE to a central processing system, obtain a precoding vector (w) from the central processing system where the precoding vector (w) is for the at least one UE across all of two or more APs, precode data to be broadcast or multicast to the at least one UE based on the precoding vector (w), and broadcast or multicast the precoded data to the at least one UE.

In one embodiment, an AP in a distributed cell-free massive MIMO network for broadcasting or multi-casting data to UEs wherein the network comprises two or more APs is provided, where the AP comprises a network interface, at least one transmitter, at least one receiver, and processing circuitry associated with the network interface, the at least one transmitter, and the at least one receiver. The processing circuitry is configured to cause the AP to obtain long-term CSI for at least one UE, communicate the long-term CSI for the at least one UE to a central processing system, obtain a precoding vector (w) from the central processing system where the precoding vector (w) is for the at least one UE across all of two or more APs, precode data to be broadcast or multicast to the at least one UE based on the precoding vector (w), and broadcast or multicast the precoded data to the at least one UE.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 17 through 20 are flow charts that illustrate example embodiments of methods implemented in a communication system such as that of FIG. 15.

DETAILED DESCRIPTION

Figure 1:
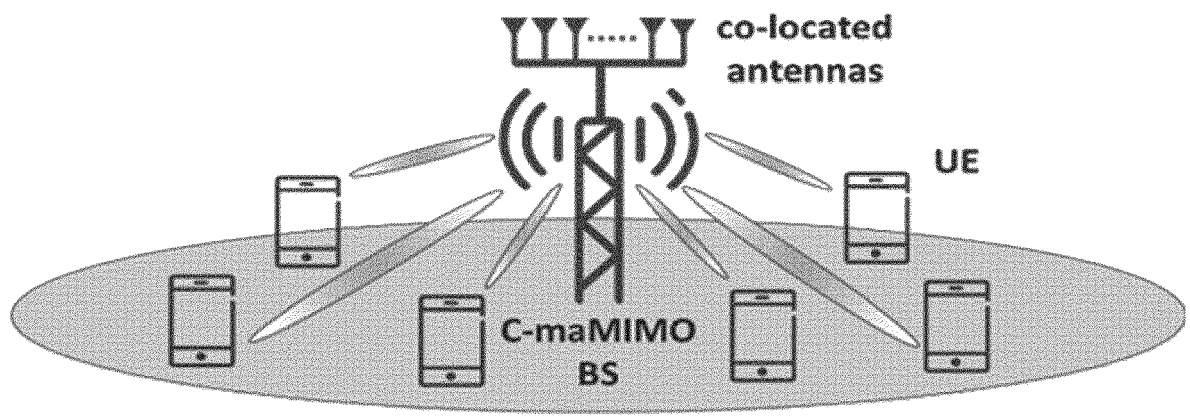
FIG. 1 illustrates Centralized massive Multiple Input Multiple Output (C-maMIMO)
Figure 2:
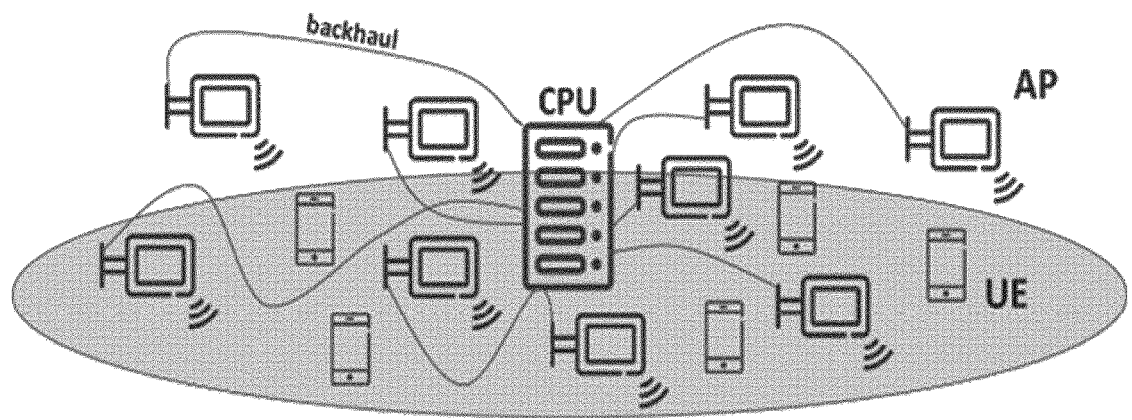
FIG. 2 illustrates Distributed massive Multiple Input Multiple Output (D-maMIMO)
Figure 3:
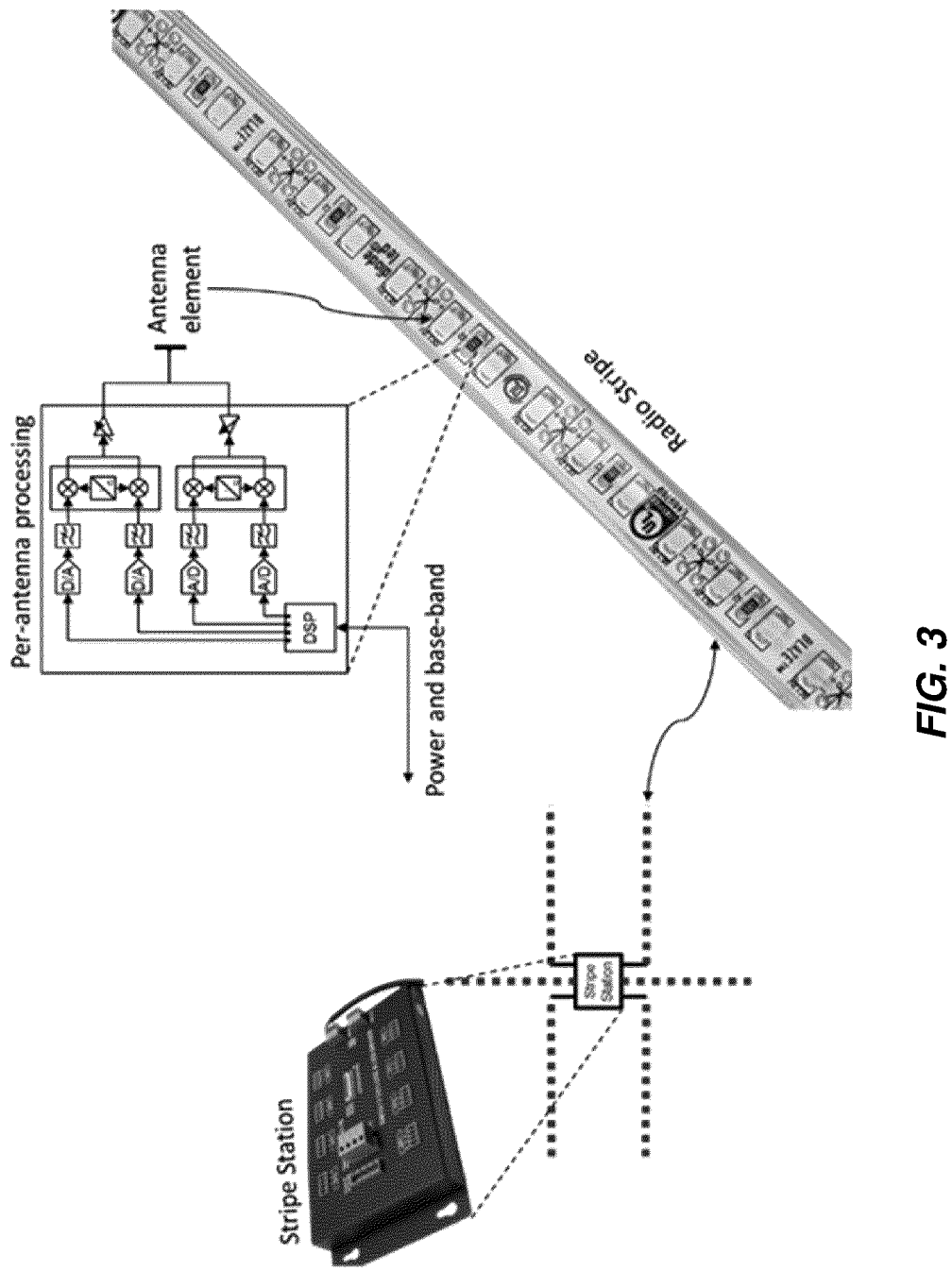
FIG. 3 illustrates an example of a stripe architecture for a D-maMIMO system.
Figure 4:
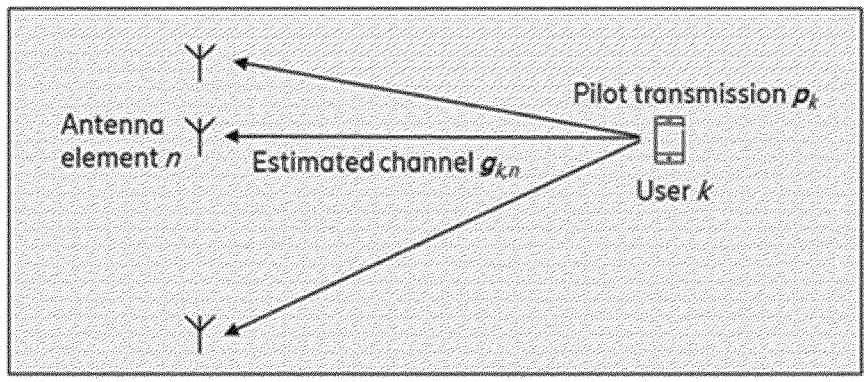
FIG. 4 illustrates an example in which both the transmitter and receiver processing in a D-maMIMO system are distributed.
Figure 4:
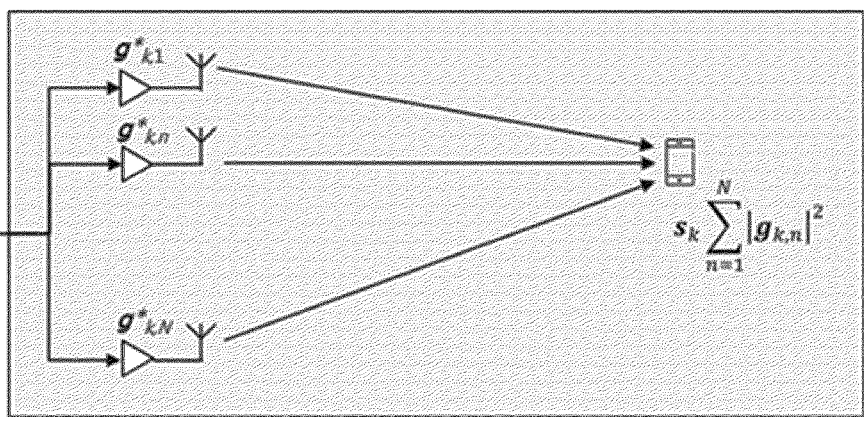

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a NR base station (gNB) in a Third Generation Partnership Project (3GPP) 5G NR network or an enhanced or evolved Node B (eNB) in a 3GPP LTE network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a UE in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

There currently exist certain challenge(s). While existing LTE Multimedia Broadcast Multicast Service (MBMS) support broadcast transmission by means of Multimedia Broadcast Multicast Service Single Frequency Network (MBSFN) and Single Cell Point to Multipoint (SC-PTM), there exist several limitations. Specifically, in MBSFN, multiple time-synchronized base stations transmit the same content in the same resource block over a larger area. The system capacity of MBSFN is limited by the user spatial distribution, especially by the channel quality of the worst-case user. Alternatively, in SC-PTM, data is broadcasted on a per-cell basis using Physical Downlink Shared Channel (PDSCH); however, the performance is subject to inter-cell interference. It may be desirable to further simplify the complex radio session setup procedure of LTE MBMS and tailor to 5G NR for enabling fast RAN sessions and efficient utilization of resources.

In traditional cellular systems, the antennas are concentrated at specific locations of base stations operating at lower carrier frequencies. In the emerging Distributed massive Multiple Input Multiple Output (D-maMIMO) networks, each user is served by multiple antenna points, and the link quality of distributed MIMO is relatively robust to blockings (i.e., the probability of all links suffered by blocking is less due to macro diversity). Thus, D-maMIMO would be suitable for operating at both micro- and millimeter-wave carrier frequencies. However, no effective solutions exist for broadcasting of data content in such cell-free/distributed networks.

One approach is to employ omnidirectional transmission at each antenna point, which can serve as baseline for the solution proposed in the present disclosure.

Certain aspects of the present disclosure and their embodiments may provide solutions to the aforementioned or other challenges. In some embodiments, long-term Channel State Information (CSI) is utilized at the Access Points (Aps). Based on this information:

users (i.e., wireless devices or UEs) receiving multicast or broadcast (multicast/broadcast) information are associated with the APs; and/or precoders are determined for each AP based on said long-term CSI for users receiving the same multicast/broadcast information.

In some embodiments, an iterative process is provided for calculating the precoder weights across APs. In each iteration, the precoder weights across APs are calculated based on the average Signal to Interference plus Noise Ratio (SINR) of the worst-case user (i.e., worst-case wireless device or UE).

In some embodiments, a distributed cell-free massive MIMO network is provided. The distributed cell-free massive MIMO network comprises at least two APs, at least one UE, and a Central Processing Unit (CPU). The CPU may also be referred to herein as a Central Unit (CU) or more generally as a "central processing system" and should be distinguished from a "central processing unit" or "CPU" of a computer architecture (e.g., an Intel CPU such as, e.g., an Intel i3, i5, or i7 CPU), which may be referred to herein as a "computer CPU" or "computer central processing unit". Each AP obtains long-term CSI (e.g., based on the filtering or processing of uplink measurements), which is communicated to the CPU. At the CPU, an (e.g., iterative) optimization is performed to compute a precoding vector across all the APs. Each AP then broadcasts the precoded multicast transmission to the UEs requiring the same content. Further, in some embodiments, the statistical channel information between APs and UEs either comprises or consists of estimated path losses. By leveraging the signals transmitted and received during initial access (i.e., before Radio Resource Control (RRC) connection establishment), the AP estimates the long-term CSI with respect to the UEs within its coverage region. For instance, each UE transmits a Physical Random Access Channel (PRACH) preamble in the uplink, which could be used to estimate the link average Signal to Noise Ratio (SNR), equivalently, the long-term channel gain between AP and UE. Since the large-scale channel coherent interval spans over several thousands of symbols, in some embodiments, the network could schedule dedicated pilot in the uplink and estimate the long-term CSI reliably in fixed intervals of time.

In some embodiments, the long-term CSI available at each AP is transferred to a central cloud, where the iterative algorithm is performed and then precoding weights are communicated to the APs for affecting them before data transmission. In other words, the CPU may be implemented "in the cloud".

Certain embodiments may provide one or more of the following technical advantage(s). Embodiments of the present disclosure provide an efficient way of on-demand data broadcasting in distributed or cell-free massive MIMO. The reliability of the broadcasting can be vastly improved. Embodiments of the present disclosure provide a broadcasting/multicasting scheme suitable for operating at both micro and millimeter-wave frequencies.

Figure 5:
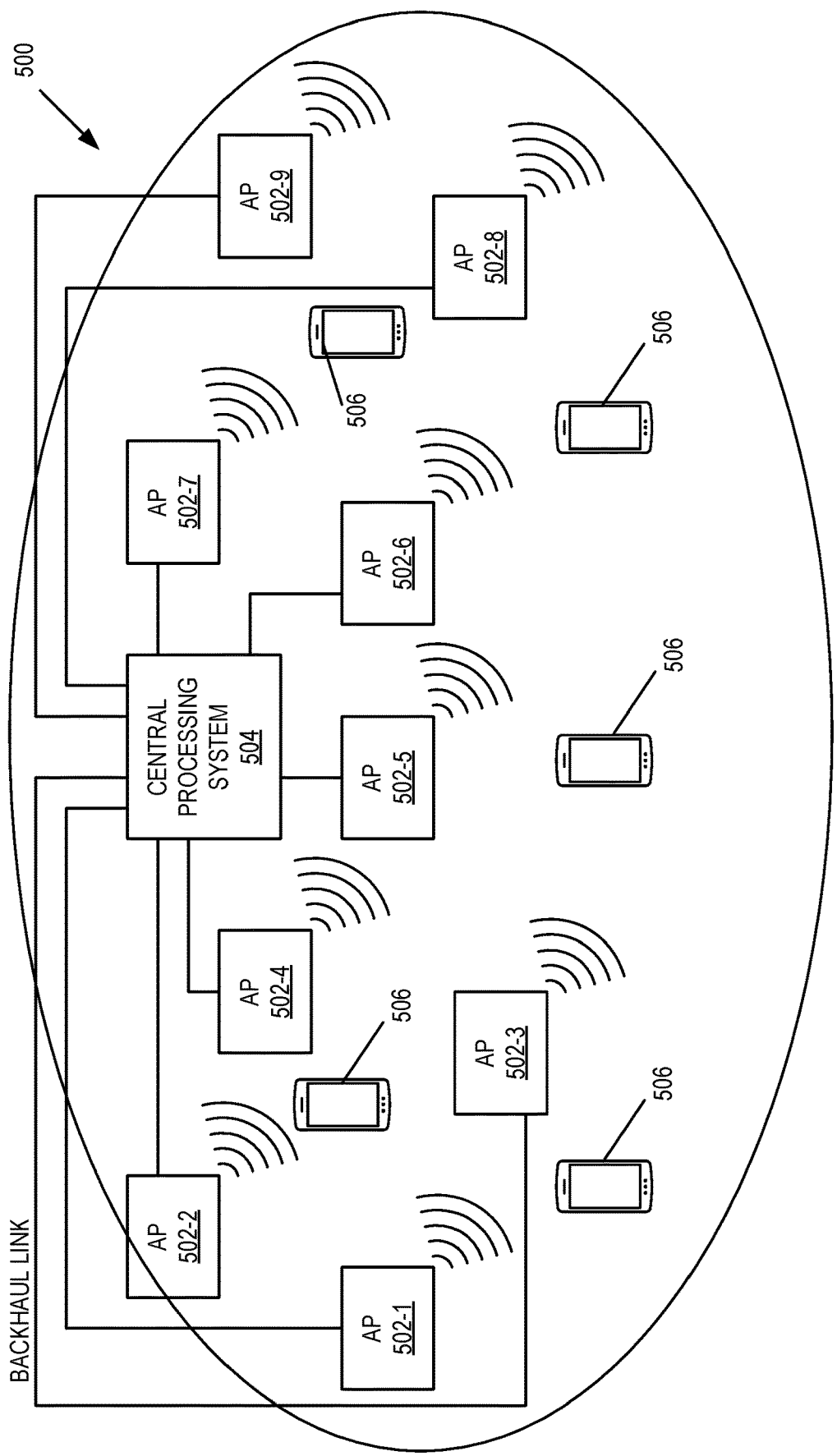
FIG. 5 illustrates one example of a D-maMIMO system in which embodiments of the present disclosure may be implemented.

FIG. 5 illustrates one example of a D-maMIMO system 500 in which embodiments of the present disclosure may be implemented. As illustrated, the D-maMIMO system 500 includes multiple APs 502-1 through 502-N (generally referred to herein collectively as APs 502 and individually as AP 502), which are geographically spread out over an area (e.g., a large area), e.g., in a well-planned or random fashion. The APs 502 are connected to a central processing system 504 (e.g., a CPU) via corresponding backhaul links (e.g., high-capacity backhaul links such as, e.g., fiber optic cables). The D-maMIMO system 500 is also known as a cell-free massive MIMO system. The APs 502 provide radio access to a number of UEs 506. In some embodiments, the D-maMIMO system 500 is or is part of a cellular communications system such as, e.g., a 5G NR system.

Now, a description will be provided of some embodiments of the present disclosure.

Consider a distributed massive MIMO system (e.g., the D-maMIMO system 500 of FIG. 5), where the APs (e.g., the APs 502) and the users (e.g., the UEs 506) feature single or multiple antennas. Each AP serves the K strongest users within a certain range, say $R_c$. Then, each user is served by multiple APs uniformly distributed within the range of $R_c$. For example, in the typical transmission, denote by M the number of APs serving the user under consideration, indexed by k. For the exposition, an embodiment of the present disclosure is presented first in terms of single-antenna APs and single-antenna users and then generalizes to a multi-antenna case. Let us assume the corresponding precoding/beamforming vector across the APs as $w=[w_1, w_2, \ldots, w_m]^T$, where $W_m$ is the precoding weight applied at the mth AP serving the user such that $\|w\|=1$.

The signal observation at the kth user is $$y_k = H_k w x + n_k$$

where x is the transmit signal with power constraint $E[x_k x_k^*] = P$ and $n_k$ is the aggregate interference and noise with covariance $\Sigma_k = E[n_k n_k^*]$.

The APs have only the knowledge of large-scale fading coefficients, but not small-scale fading coefficients, which are essentially used to obtain the correlations as $$\Theta_k = E[H_k^* \Sigma_k^{-1} H_k] k=1, \ldots, K$$

each of which is estimated by the AP during connection establishment. In the context of distributed massive MIMO, there are relatively larger spacings across antennas or APs. For instance, if we consider 2 gigahertz (GHz) carrier frequency or wavelength $\lambda=0.15$ m, then the antenna spacing lies in the range of [100λ, 200λ] for inter-AP distances [15, 30] m. For such larger antenna spacings, the antennas become independent and the correlation coefficient drops to zero, which consequently gives the diagonal correlation matrix whose diagonal entries are essentially reflected by the pathloss and shadowing between APs and the user. While the channel matrices vary on faster time scale due to small-scale fading, the correlations $\Theta_k$, k=1, ..., K vary on a relatively slower time scale.

The local-average SINR at the kth user is $$\gamma_k = E[\|\Sigma_k^{-1/2} H_k w x\|^2] = PE[w^* H_k^* \Sigma_k^{-1} H_k w] = Pw^* \Theta_k w$$

which is the metric used to optimize the precoder w, rather than the instantaneous SINRs, which are subject to fast fading whose knowledge is not available at the APs.

Base line precoder is $$w = \frac{1}{\sqrt{M}}[1, \ldots, 1]^T.$$

Figure 8:
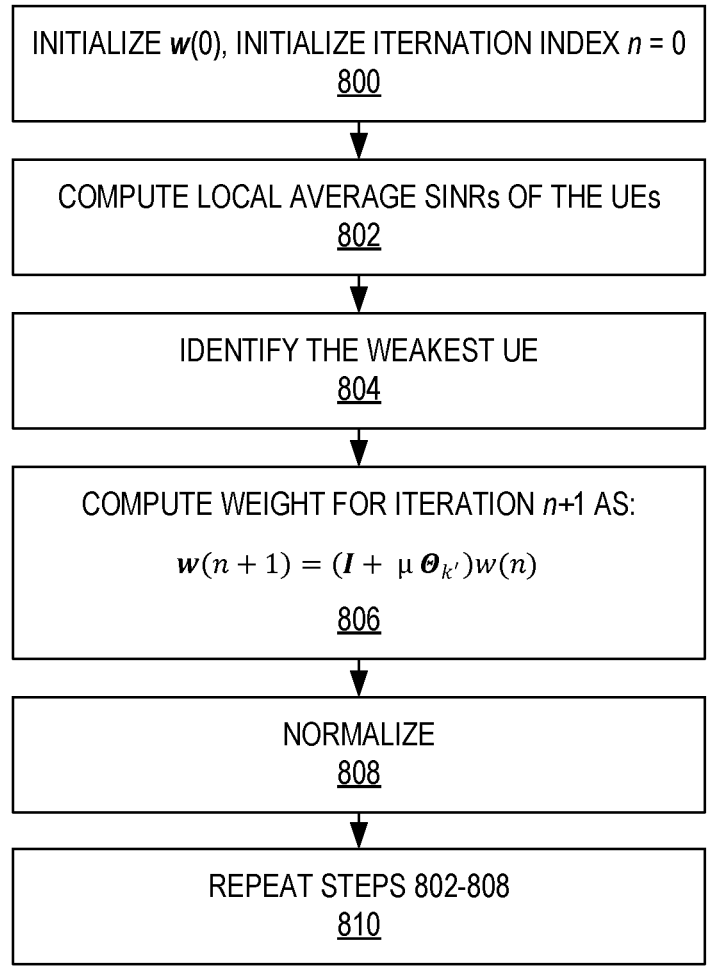
FIG. 8 illustrate an iterative process for computing a precoding weight vector for broadcasting/multicasting data to User Equipments (UEs) from multiple Access Points (APs) in a D-maMIMO system in accordance with one embodiment of the present disclosure.

Alternatively, the precoding vector is optimized iteratively such that, in each iteration w, the precoding vector is steered to maximize the average SINR of the worst-case user by leveraging the gradient of the average SINRs as $\Theta_k w$, k=1, ..., K. The steps of the process are as illustrated in FIG. 8 and described as follows. Note that these steps are preferably performed by the CPU (e.g., the central processing system 504).

Step 800: Initialize $$w(0) = \frac{1}{\sqrt{M}}[1, \ldots, 1]^T;$$

Step 802: Compute the local-average SINRs of users as $\gamma_k = Pw^* \Theta_k w$, k=1, ..., K, by means of $\Theta_k$;

Step 804: Identify the weakest user, whose index is k' such that $$k' = \arg\min_{k=1,\ldots,K} \gamma_k;$$

Step 806: At iteration n+1, $w(n+1)=(I+\mu\Theta_{k'})w(n)$;

Step 808: Normalize precoder as $w(n+1)=w(n+1)/\|w(n+1)\|$;

Step 210: Repeat steps 802-808 until convergence or for a fixed number of iterations set a priori based on the convergence criteria.

Note that the mathematical formulas in the steps above are only examples. Variations will be apparent to those of skill in the art. For example, one variation is that if all the antennas are collocated at one base station or access point, then this precoding computation algorithm can be performed at the access point itself without communicating to the CPU. As another example, one could also perform in between these two variations. And, one could also utilize a different iterative algorithm by formulating different objective criteria, for e.g., to maximize the average SINR of the high priority user while guaranteeing the minimum SINR for the other users by assigning priorities to the users, instead of maximizing the worst-case user average SINR at each iteration.

The performance of the proposed process is evaluated by the numerical results presented below.

Evaluation methodology: Consider a live event situated in a city center of radius 500 meters (m), where K users are requesting the same data. These K users are randomly located. We assume that M=64 APs are uniformly distributed in random locations in a circular region of radius 750 m surrounding this live event. All the APs are connected to a CPU via high speed link. To reflect the realistic interference environment, we extend the network to the radius of 2 kilometers (km), such that the interfering APs are distributed with the same density. We simulated 5000 such network realizations to gather statistics.

Figure 6:
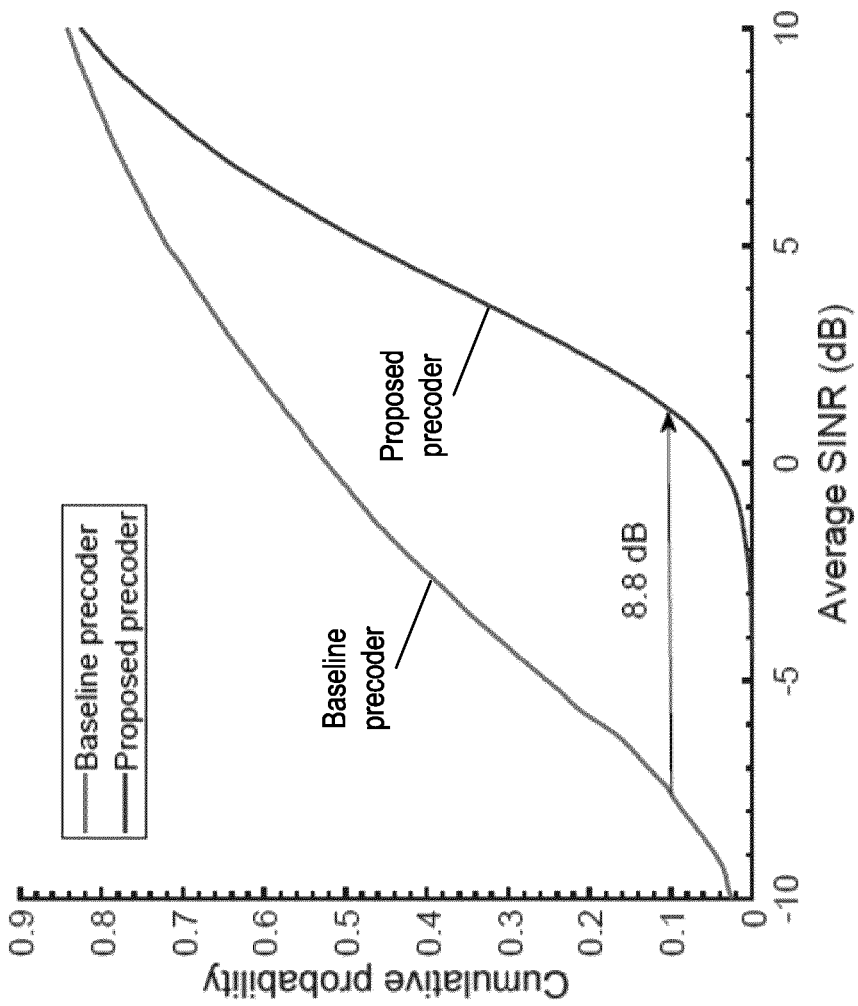
FIG. 6 illustrates a comparison of the cumulative distribution of the local-average Signal to Interference plus Noise Ratio (SINR) for a baseline precoder and an iteratively optimized precoder in accordance with an example embodiment of the present disclosure.

The cumulative distribution of the local-average SINRs are compared in FIG. 6 for baseline precoder and iteratively optimized precoder, both with K=4. As indicated in FIG. 6, the gain in the local-average SINR corresponding to the worst 10% point is around 8.4 decibels (dB), which is significant.

Figure 7:
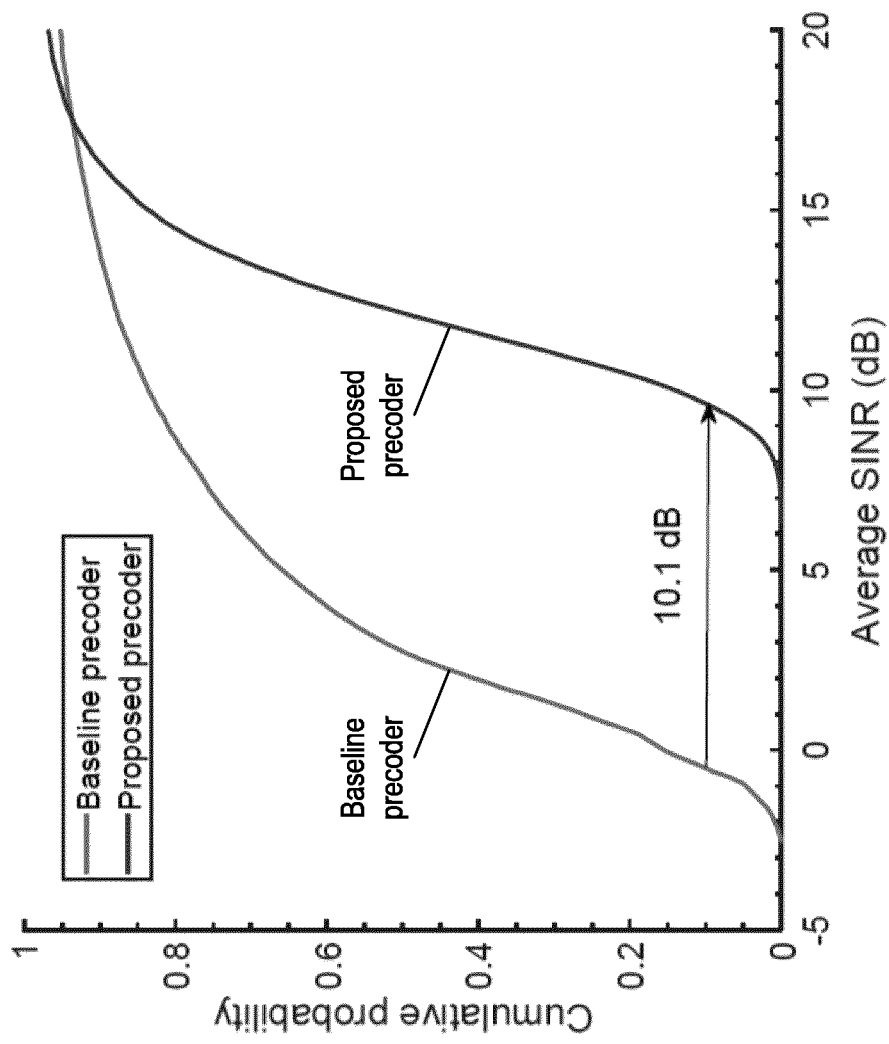
FIG. 7 illustrates the performance advantage of the example embodiment of the iteratively optimized precoder.

To verify the performance advantages of the proposed method, we repeated the experiment with APs placed in fixed locations according to hexagonal layout with inter-AP distance set to 200 m. This gives around M=55 APs in the circular region of 750 m. The corresponding Cumulative Probability Distribution Functions (CDFs) of local-average SINRs are contrasted in FIG. 7. As can be seen in FIG. 7, the performance advantage of the proposed precoder is significant.

Shown in Table 1 is the gain in local-average SINR for M=64 and varying K at 10-percentile point of the CDF by the iteratively optimized precoder over the baseline precoder.

TABLE 1

Gain in the average SINR achieved by the iteratively optimized precoder with respect to the baseline precoder.

| K | Gain in local-average SINR at 10% point of the CDF with APs located randomly in each NW realization | Gain in local-average SINR at 10% point of the CDF with APs placed in fixed hexagonal layout |
|---|---|---|
| 1 | 13 dB | 14.8 dB |
| 2 | 10.6 dB | 12.7 dB |
| 4 | 8.4 dB | 10.1 dB |
| 8 | 6.5 dB | 8 dB |
| 12 | 5.6 dB | 6.9 dB |
| 16 | 5.1 dB | 6.1 dB |
| 50 | 3.3 dB | 3.7 dB |

In some embodiments, the network falls back to using the "base-line precoder" (or some other precoder not utilizing average CSI) when the number of multicast users exceed a predefined threshold.

In some embodiments, the network utilizes a unicast transmission format for multicast services in case the number of users receiving said multicast service is small (e.g., below a threshold).

Figure 9:
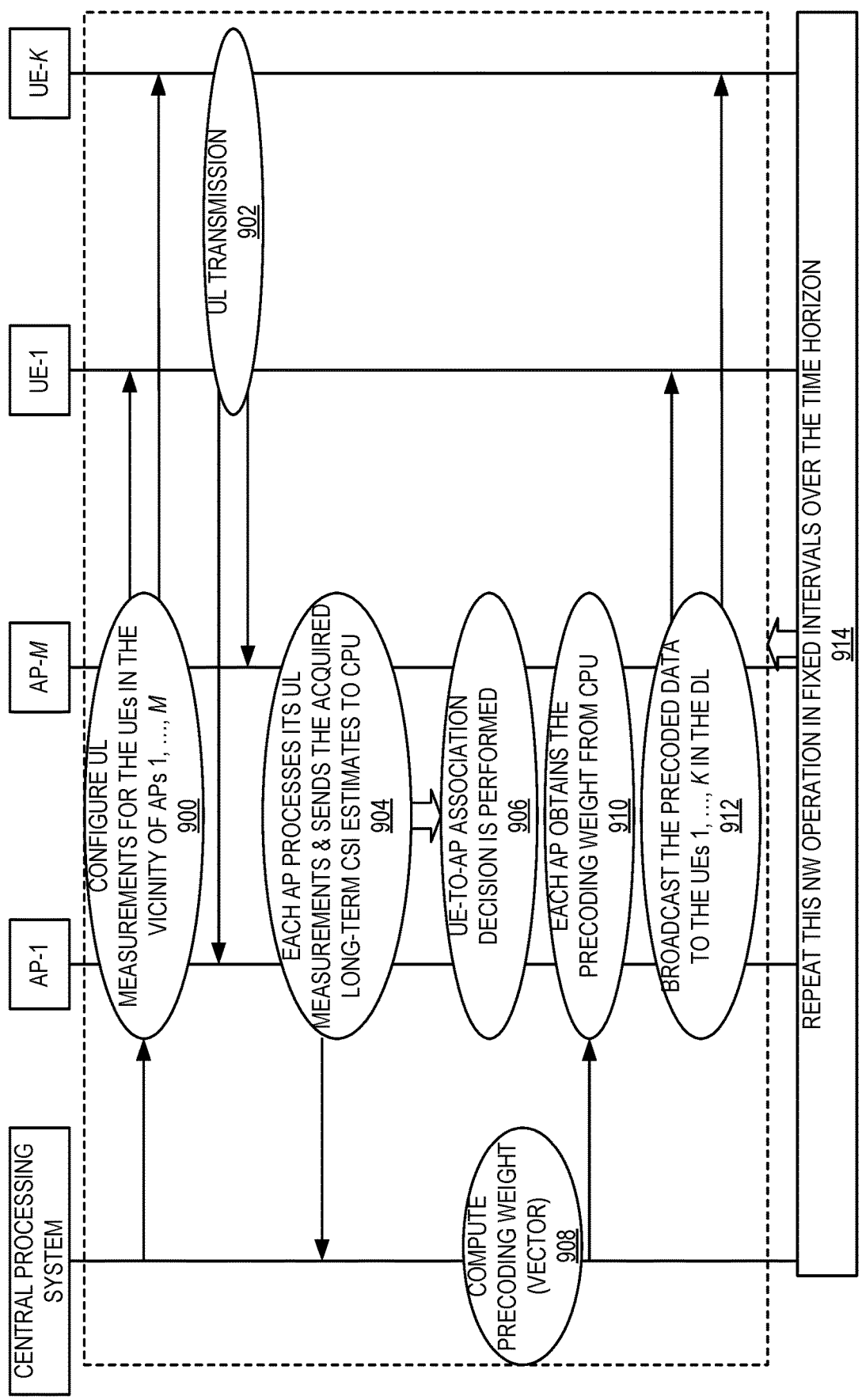
FIG. 9 illustrates the operation of the D-maMIMO system of FIG. 5 in the context of a Fifth Generation (5G) New Radio (NR) access network in accordance with some embodiments of the present disclosure.

FIG. 9 illustrates the operation of the D-maMIMO system 500 of FIG. 5 in the context of a 5G NR access network in accordance with some embodiments of the present disclosure. As illustrated, the central processing system 504 configures uplink measurements for the UEs 506-1 through 506-K (denoted here as UE-1 to UE-K) in the vicinity of the APs 502-1 through 502-M (denoted here as AP-1 through AP-M) (step 900). UE-1 through UE-K transmit uplink transmissions (step 902), which are received by AP-1 through AP-K.

Each AP (denoted here as AP-m, where m=1, . . . , M) performs uplink measurements on the received uplink transmissions, processes its uplink measurements to acquire long-term CSI estimates for UE-1 through UE-K, and sends the acquired long-term CSI estimates to the central processing system 504 (step 904). Note that $\Theta_k$ is computed based on the long-term CSI estimates, which can be interpreted as the covariance of channel estimates.

A UE-to-AP association decision is performed (step 906). UE-to-AP association can be autonomous across APs. For e.g., each UE is associated with the APs that provide higher received signal power (RSRP) (e.g., higher than a certain RSRP threshold) in the downlink. This is part of the connection establishment process or initial access of the network. Each AP aims to serve the UEs associated with it.

The central processing system 504 uses the long-term CSI estimates received from the APs (AP-1 through AP-K) to compute a precoding weight w for broadcasting/multicasting data to the UEs (UE-1 through UE-K) (step 908). More specifically, the central processing system 504 uses the process described above (see, e.g., steps 800-810 of FIG. 8 described above) to compute the precoding weight w to be applied across the APs for broadcasting/multicasting data to the UEs (UE-1 through UE-K).

The central processing system 504 provides the computed precoding weight w to the APs. In this manner, the APs obtain the precoding weight w from the central processing system 504 (step 910). Note that each AP only obtains the precoder weights for the UEs that are associated with that AP (via the UE-to-AP association decision). The APs then precode data to be multicast/broadcast to the UEs (UE-1 through UE-K) using the precoding weight w and multicast/broadcast the resulting precoded data (step 9712).

This process may be repeated, e.g., in fixed intervals of, e.g., 100 milliseconds depending on the traffic variations (step 914). Note that this interval may be based on the "time horizon," which is the time over which the conditions for the algorithm are to be stable. For example, it is the time after which $\Theta_k = E[H_k^* \Sigma_k^{-1} H_k]$ has changed significantly and the algorithm needs to be updated. The value of 100 ms for the interval is a good example of a typical value, but it depends on, e.g., the frequency band (higher frequencies require more frequent updates), the UE speed (high UE speed requires more frequent updates), and on the speed of other objects in the environment. In a very stationary environment, an update periodicity of 1 second might be good enough.

Note that description above is presented in terms of single-antenna APs and single-antenna users but generalizes to a multi-antenna case. For example, if the APs feature multiple antennas, then the scalar precoding weights $w_m$ becomes precoding vectors of dimension equal to the number of antennas at the APs and a similar procedure can be applied as in the case of single-antenna APs.

Figure 10:
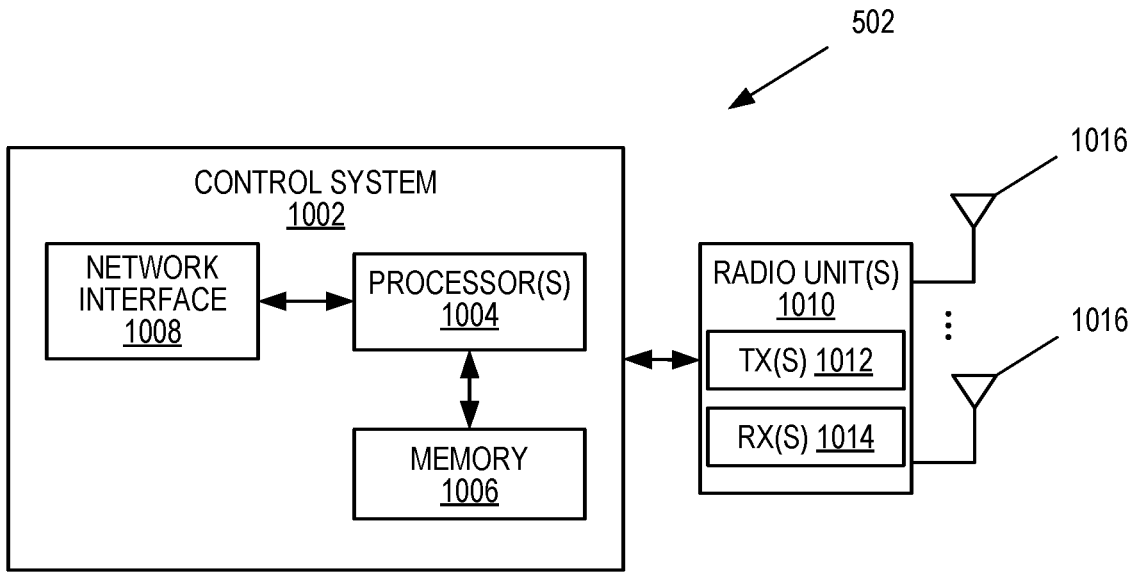
FIGS. 10 and 11 are schematic block diagrams of example embodiments of an AP in accordance with the present disclosure.

FIG. 10 is a schematic block diagram of an AP 502 according to some embodiments of the present disclosure. As illustrated, the AP 502 includes a control system 1002 that includes one or more processors 1004 (e.g., CPUs, Application Specific Integrated Circuits (ASICs), Field Programmable Gate Arrays (FPGAs), and/or the like), memory 1006, and a network interface 1008. The one or more processors 1004 are also referred to herein as processing circuitry. In addition, the AP 502 includes one or more radio units 1010 that each includes one or more transmitters 1012 and one or more receivers 1014 coupled to one or more antennas 1016. The radio units 1010 may be referred to or be part of radio interface circuitry. In some embodiments, the radio unit(s) 1010 is external to the control system 1002 and connected to the control system 1002 via, e.g., a wired connection (e.g., an optical cable). However, in some other embodiments, the radio unit(s) 1010 and potentially the antenna(s) 1016 are integrated together with the control system 1002. The one or more processors 1004 operate to provide one or more functions of the AP 502 as described herein. In some embodiments, the function(s) are implemented in software that is stored, e.g., in the memory 1006 and executed by the one or more processors 1004.

In some embodiments, a computer program including instructions which, when executed by at least one processor, causes the at least one processor to carry out the functionality of the AP 502 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
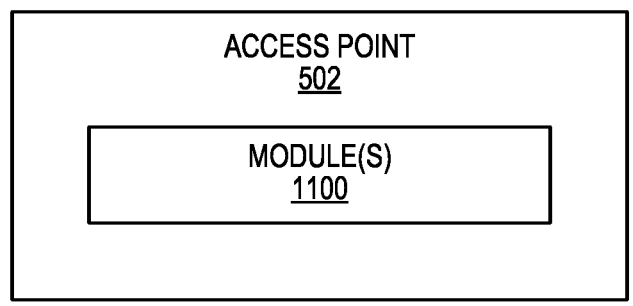

FIG. 11 is a schematic block diagram of the AP 502 according to some other embodiments of the present disclosure. The AP 502 includes one or more modules 1100, each of which is implemented in software. The module(s) 1100 provide the functionality of AP 502 described herein.

Figure 12:
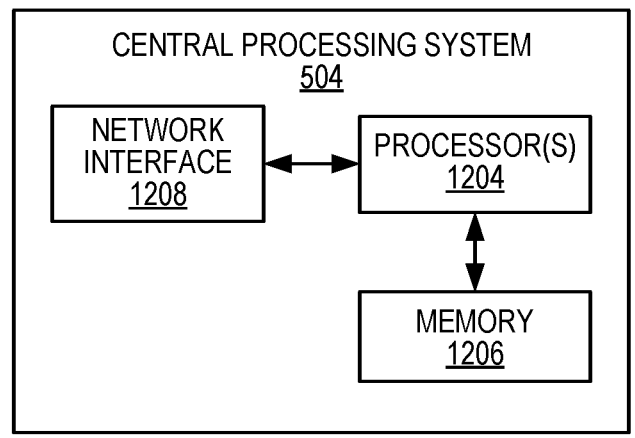
FIGS. 12 through 14 are schematic block diagrams of example embodiments of central processing system in accordance with the present disclosure.

FIG. 12 is a schematic block diagram of the central processing system 504 according to some embodiments of the present disclosure. As illustrated, the central processing system 504 includes one or more processors 1204 (e.g., CPUs, ASICs, FPGAs, and/or the like), memory 1206, and a network interface 1208. The one or more processors 1204 are also referred to herein as processing circuitry. The one or more processors 1204 operate to provide one or more functions of the central processing system 504 as described herein. In some embodiments, the function(s) are implemented in software that is stored, e.g., in the memory 1206 and executed by the one or more processors 1204.

Figure 13:
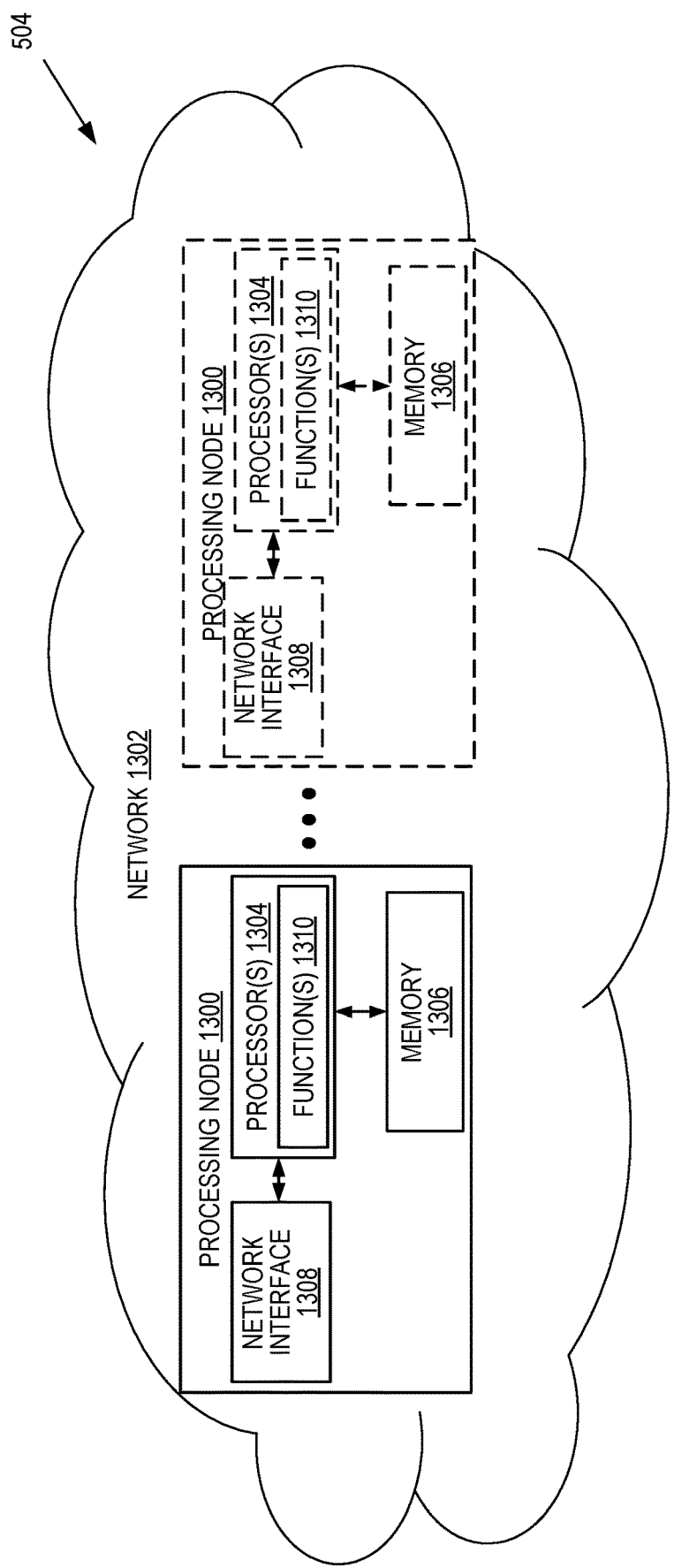

FIG. 13 is a schematic block diagram that illustrates a virtualized embodiment of the central processing system 504 according to some embodiments of the present disclosure. As used herein, a "virtualized" central processing system 504 is an implementation of the central processing system 504 in which at least a portion of the functionality of the central processing system 504 is implemented as a virtual component(s) (e.g., via a virtual machine(s) executing on a physical processing node(s) in a network(s)). As illustrated, in this example, the central processing system 504 includes one or more processing nodes 1300 coupled to or included as part of a network(s) 1302. Each processing node 1300 includes one or more processors 1304 (e.g., CPUs, ASICs, FPGAs, and/or the like), memory 1306, and a network interface 1308.

In this example, functions 1310 of the central processing system 504 described herein are implemented at the one or more processing nodes 1300. In some particular embodiments, some or all of the functions 1310 of the central processing system 504 described herein are implemented as virtual components executed by one or more virtual machines implemented in a virtual environment(s) hosted by the processing node(s) 1300.

In some embodiments, a computer program including instructions which, when executed by at least one processor, causes the at least one processor to carry out the functionality of the central processing system 504 or a node (e.g., a processing node 1300) implementing one or more of the functions 1310 of the central processing system 504 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 14:
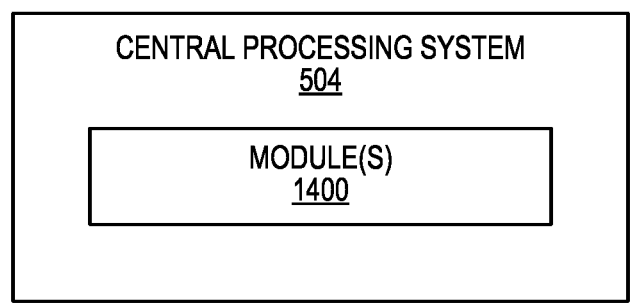

FIG. 14 is a schematic block diagram of the central processing system 504 according to some other embodiments of the present disclosure. The central processing system 504 includes one or more modules 1400, each of which is implemented in software. The module(s) 1400 provide the functionality of the central processing system 504 described herein. This discussion is equally applicable to the processing node 1300 of FIG. 13 where the modules 1400 may be implemented at one of the processing nodes 1300 or distributed across multiple processing nodes 1300.

Figure 15:
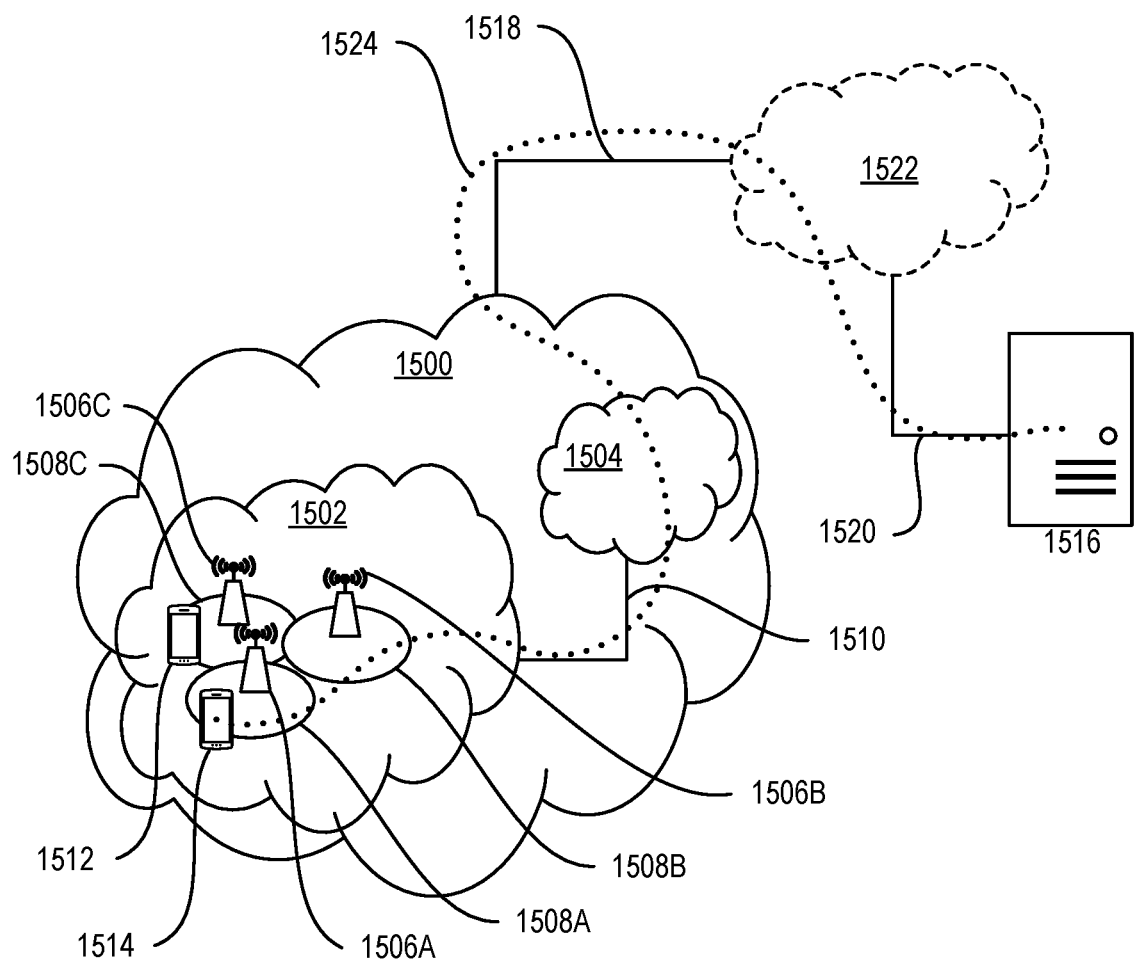
FIG. 15 illustrates an example embodiment of a communication system in which embodiments of the present disclosure may be implemented.

With reference to FIG. 15, in accordance with an embodiment, a communication system includes a telecommunication network 1500, such as a 3GPP-type cellular network, which comprises an access network 1502, such as a RAN, and a core network 1504. The access network 1502 comprises a plurality of base stations 1506A, 1506B, 1506C, such as Node Bs, eNBs, gNBs, or other types of wireless APs, each defining a corresponding coverage area 1508A, 1508B, 1508C. Each base station 1506A, 1506B, 1506C is connectable to the core network 1504 over a wired or wireless connection 1510. A first UE 1512 located in coverage area 1508C is configured to wirelessly connect to, or be paged by, the corresponding base station 1506C. A second UE 1514 in coverage area 1508A is wirelessly connectable to the corresponding base station 1506A. While a plurality of UEs 1512, 1514 are illustrated in this example, the disclosed embodiments are equally applicable to a situation where a sole UE is in the coverage area or where a sole UE is connecting to the corresponding base station 1506.

The telecommunication network 1500 is itself connected to a host computer 1516, which may be embodied in the hardware and/or software of a standalone server, a cloud-implemented server, a distributed server, or as processing resources in a server farm. The host computer 1516 may be under the ownership or control of a service provider, or may be operated by the service provider or on behalf of the service provider. Connections 1518 and 1520 between the telecommunication network 1500 and the host computer 1516 may extend directly from the core network 1504 to the host computer 1516 or may go via an optional intermediate network 1522. The intermediate network 1522 may be one of, or a combination of more than one of, a public, private, or hosted network; the intermediate network 1522, if any, may be a backbone network or the Internet; in particular, the intermediate network 1522 may comprise two or more sub-networks (not shown).

The communication system of FIG. 15 as a whole enables connectivity between the connected UEs 1512, 1514 and the host computer 1516. The connectivity may be described as an Over-the-Top (OTT) connection 1524. The host computer 1516 and the connected UEs 1512, 1514 are configured to communicate data and/or signaling via the OTT connection 1524, using the access network 1502, the core network 1504, any intermediate network 1522, and possible further infrastructure (not shown) as intermediaries. The OTT connection 1524 may be transparent in the sense that the participating communication devices through which the OTT connection 1524 passes are unaware of routing of uplink and downlink communications. For example, the base station 1506 may not or need not be informed about the past routing of an incoming downlink communication with data originating from the host computer 1516 to be forwarded (e.g., handed over) to a connected UE 1512. Similarly, the base station 1506 need not be aware of the future routing of an outgoing uplink communication originating from the UE 1512 towards the host computer 1516.

Example implementations, in accordance with an embodiment, of the UE, base station, and host computer discussed in the preceding paragraphs will now be described with reference to FIG. 16. In a communication system 1600, a host computer 1602 comprises hardware 1604 including a communication interface 1606 configured to set up and maintain a wired or wireless connection with an interface of a different communication device of the communication system 1600. The host computer 1602 further comprises processing circuitry 1608, which may have storage and/or processing capabilities. In particular, the processing circuitry 1608 may comprise one or more programmable processors, ASICs, FPGAs, or combinations of these (not shown) adapted to execute instructions. The host computer 1602 further comprises software 1610, which is stored in or accessible by the host computer 1602 and executable by the processing circuitry 1608. The software 1610 includes a host application 1612. The host application 1612 may be operable to provide a service to a remote user, such as a UE 1614 connecting via an OTT connection 1616 terminating at the UE 1614 and the host computer 1602. In providing the service to the remote user, the host application 1612 may provide user data which is transmitted using the OTT connection 1616.

The communication system 1600 further includes a base station 1618 provided in a telecommunication system and comprising hardware 1620 enabling it to communicate with the host computer 1602 and with the UE 1614. The hardware 1620 may include a communication interface 1622 for setting up and maintaining a wired or wireless connection with an interface of a different communication device of the communication system 1600, as well as a radio interface 1624 for setting up and maintaining at least a wireless connection 1626 with the UE 1614 located in a coverage area (not shown in FIG. 16) served by the base station 1618. The communication interface 1622 may be configured to facilitate a connection 1628 to the host computer 1602. The connection 1628 may be direct or it may pass through a core network (not shown in FIG. 16) of the telecommunication system and/or through one or more intermediate networks outside the telecommunication system. In the embodiment shown, the hardware 1620 of the base station 1618 further includes processing circuitry 1630, which may comprise one or more programmable processors, ASICs, FPGAs, or combinations of these (not shown) adapted to execute instructions. The base station 1618 further has software 1632 stored internally or accessible via an external connection.

The communication system 1600 further includes the UE 1614 already referred to. The UE's 1614 hardware 1634 may include a radio interface 1636 configured to set up and maintain a wireless connection 1626 with a base station serving a coverage area in which the UE 1614 is currently located. The hardware 1634 of the UE 1614 further includes processing circuitry 1638, which may comprise one or more programmable processors, ASICs, FPGAs, or combinations of these (not shown) adapted to execute instructions. The UE 1614 further comprises software 1640, which is stored in or accessible by the UE 1614 and executable by the processing circuitry 1638. The software 1640 includes a client application 1642. The client application 1642 may be operable to provide a service to a human or non-human user via the UE 1614, with the support of the host computer 1602. In the host computer 1602, the executing host application 1612 may communicate with the executing client application 1642 via the OTT connection 1616 terminating at the UE 1614 and the host computer 1602. In providing the service to the user, the client application 1642 may receive request data from the host application 1612 and provide user data in response to the request data. The OTT connection 1616 may transfer both the request data and the user data. The client application 1642 may interact with the user to generate the user data that it provides.

Figure 16:
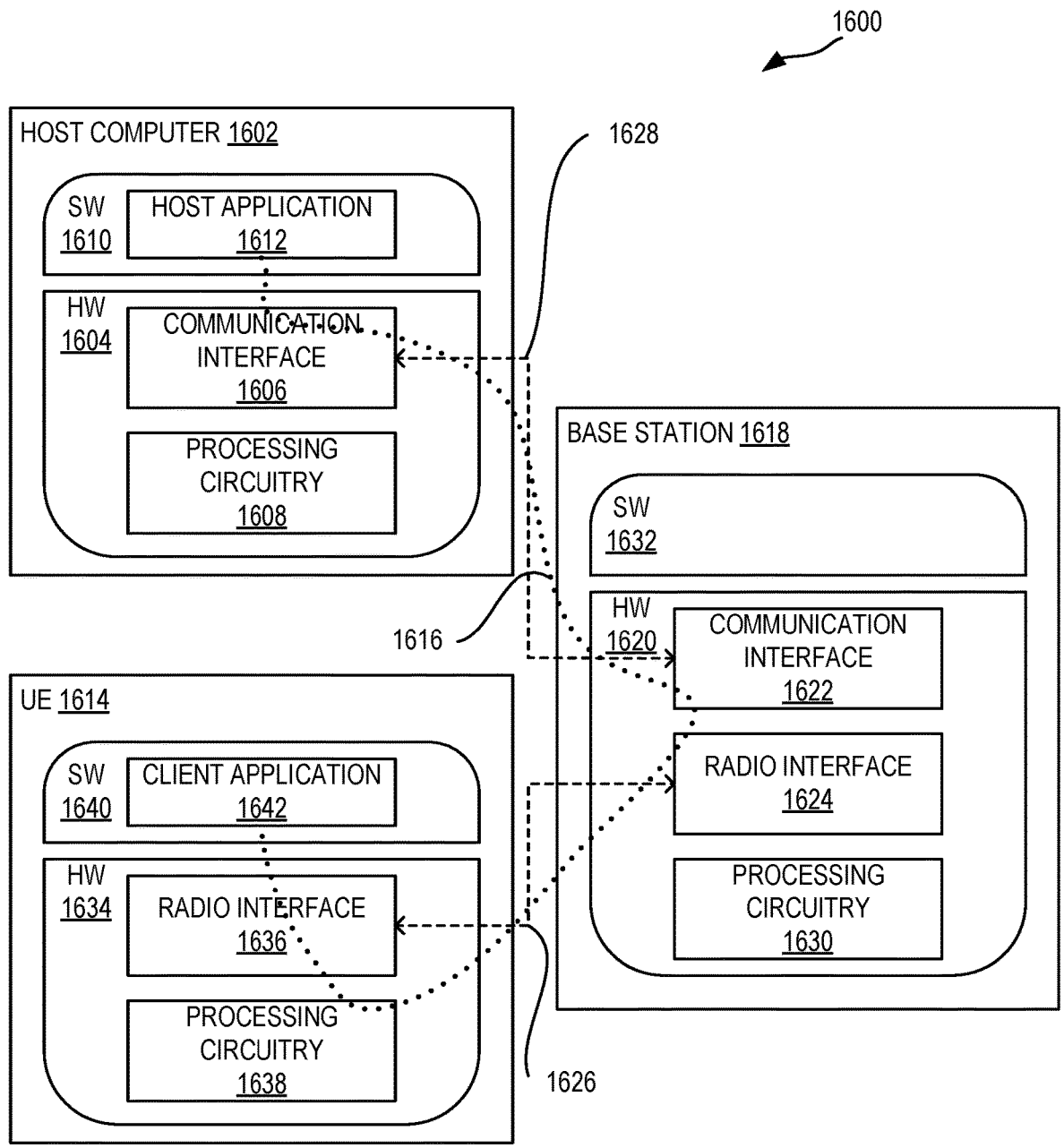
FIG. 16 illustrates example embodiments of the host computer, base station, and UE of FIG. 15.

It is noted that the host computer 1602, the base station 1618, and the UE 1614 illustrated in FIG. 16 may be similar or identical to the host computer 1516, one of the base stations 1506A, 1506B, 1506C, and one of the UEs 1512, 1514 of FIG. 15, respectively. This is to say, the inner workings of these entities may be as shown in FIG. 16 and independently, the surrounding network topology may be that of FIG. 15.

In FIG. 16, the OTT connection 1616 has been drawn abstractly to illustrate the communication between the host computer 1602 and the UE 1614 via the base station 1618 without explicit reference to any intermediary devices and the precise routing of messages via these devices. The network infrastructure may determine the routing, which may be configured to hide from the UE 1614 or from the service provider operating the host computer 1602, or both. While the OTT connection 1616 is active, the network infrastructure may further take decisions by which it dynamically changes the routing (e.g., on the basis of load balancing consideration or reconfiguration of the network).

The wireless connection 1626 between the UE 1614 and the base station 1618 is in accordance with the teachings of the embodiments described throughout this disclosure. One or more of the various embodiments improve the performance of OTT services provided to the UE 1614 using the OTT connection 1616, in which the wireless connection 1626 forms the last segment.

A measurement procedure may be provided for the purpose of monitoring data rate, latency, and other factors on which the one or more embodiments improve. There may further be an optional network functionality for reconfiguring the OTT connection 1616 between the host computer 1602 and the UE 1614, in response to variations in the measurement results. The measurement procedure and/or the network functionality for reconfiguring the OTT connection 1616 may be implemented in the software 1610 and the hardware 1604 of the host computer 1602 or in the software 1640 and the hardware 1634 of the UE 1614, or both. In some embodiments, sensors (not shown) may be deployed in or in association with communication devices through which the OTT connection 1616 passes; the sensors may participate in the measurement procedure by supplying values of the monitored quantities exemplified above, or supplying values of other physical quantities from which the software 1610, 1640 may compute or estimate the monitored quantities. The reconfiguring of the OTT connection 1616 may include message format, retransmission settings, preferred routing, etc.; the reconfiguring need not affect the base station 1618, and it may be unknown or imperceptible to the base station 1618. Such procedures and functionalities may be known and practiced in the art. In certain embodiments, measurements may involve proprietary UE signaling facilitating the host computer 1602's measurements of throughput, propagation times, latency, and the like. The measurements may be implemented in that the software 1610 and 1640 causes messages to be transmitted, in particular empty or 'dummy' messages, using the OTT connection 1616 while it monitors propagation times, errors, etc.

Figures 17, 18:
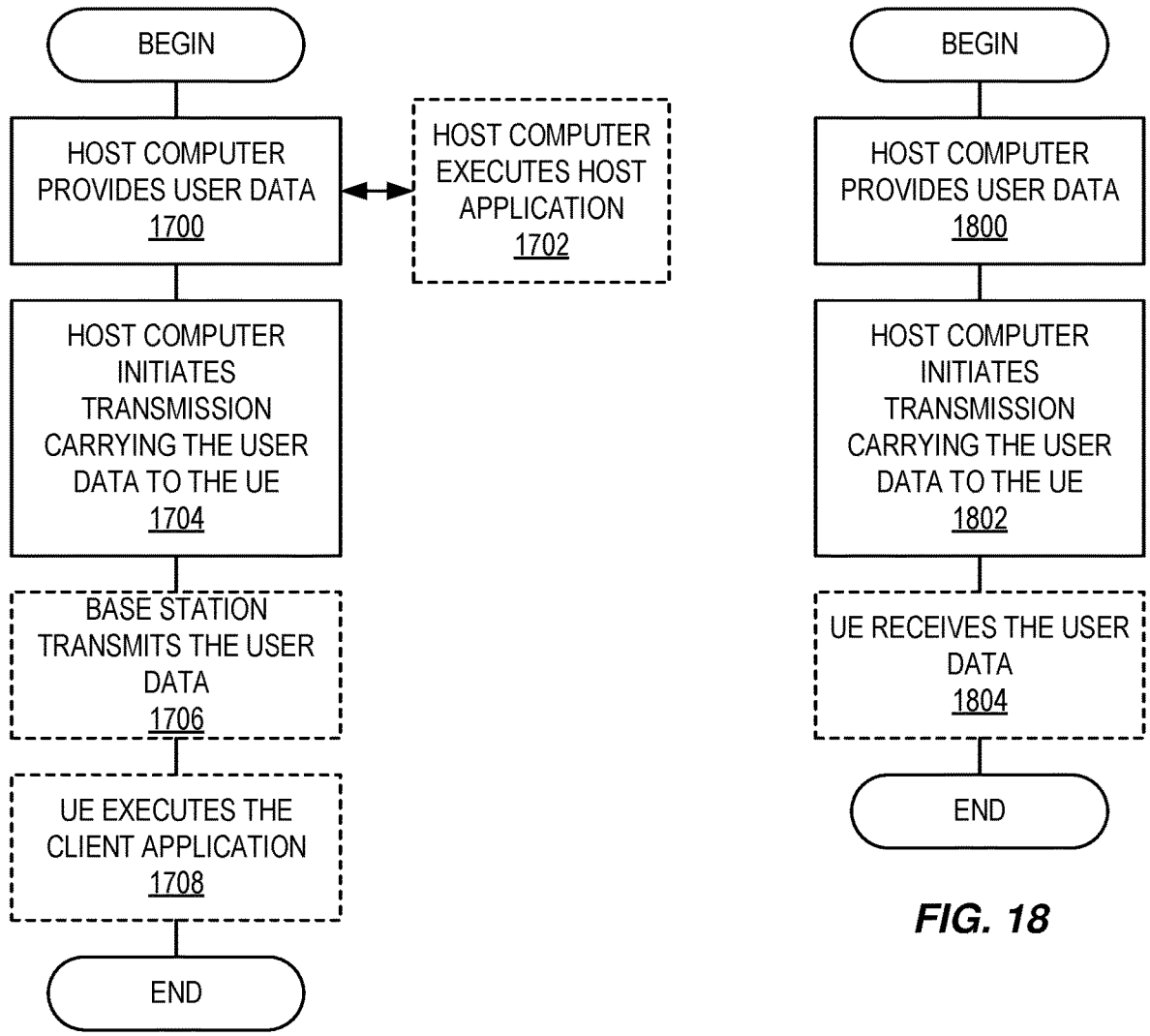

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1700, the host computer provides user data. In sub-step 1702 (which may be optional) of step 1700, the host computer provides the user data by executing a host application. In step 1704, the host computer initiates a transmission carrying the user data to the UE. In step 1706 (which may be optional), the base station transmits to the UE the user data which was carried in the transmission that the host computer initiated, in accordance with the teachings of the embodiments described throughout this disclosure. In step 1708 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1800 of the method, the host computer provides user data. In an optional sub-step (not shown) the host computer provides the user data by executing a host application. In step 1802, the host computer initiates a transmission carrying the user data to the UE. The transmission may pass via the base station, in accordance with the teachings of the embodiments described throughout this disclosure. In step 1804 (which may be optional), the UE receives the user data carried in the transmission.

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1900 (which may be optional), the UE receives input data provided by the host computer. Additionally or alternatively, in step 1902, the UE provides user data. In sub-step 1904 (which may be optional) of step 1900, the UE provides the user data by executing a client application. In sub-step 1906 (which may be optional) of step 1902, the UE executes a client application which provides the user data in reaction to the received input data provided by the host computer. In providing the user data, the executed client application may further consider user input received from the user. Regardless of the specific manner in which the user data was provided, the UE initiates, in sub-step 1908 (which may be optional), transmission of the user data to the host computer. In step 1910 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2000 (which may be optional), in accordance with the teachings of the embodiments described throughout this disclosure, the base station receives user data from the UE. In step 2002 (which may be optional), the base station initiates transmission of the received user data to the host computer. In step 2004 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Some example embodiments of the present disclosure are as follows.

Group A Embodiments

Embodiment 1: A method for broadcasting or multicasting data to User Equipments, UEs, in a distributed cell-free massive Multiple Input Multiple Output, MIMO, network, comprising any one or more of the following actions:
at each Access Point, AP, (502-*m*) of two or more APs (502-1, . . . , 502-M):
obtaining (904) long-term Channel State Information, CSI, for at least one UE (506); and
communicating (904) the long-term CSI for the at least one UE (506) to a central processing system (504);
at the central processing system (504):
for each AP (502-*m*) of the two or more APs (502-1, . . . , 502-M), receiving (904) the long-term CSI for the at least one UE (506) from the AP (502-*m*);
computing (908) a precoding vector, w, for the at least one UE (506) across the two or more APs (502-1, . . . , 502-M) based on the long-term CSI for the at least one UE (506) received from the two or more APs (502-1, . . . , 502-M); and
communicating (910) the precoding vector, w, to the two or more APs (502-1, . . . , 502-M); and
at each AP (502-*m*) of the two or more APs (502-1, . . . , 502-M):
obtaining (910) the precoding vector, w, from the central processing system (504);
precoding (912) data to be broadcast or multicast to the at least one UE (506) based on the precoding vector, w; and
broadcasting or multicasting (912) the precoded data to the at least one UE (506).

Embodiment 2: The method of embodiment 1 wherein the at least one UE (506) is two or more UEs (506-1, . . . , 506-K).

Embodiment 3: The method of embodiment 1 or 2 wherein computing (908) the precoding vector, w, comprises:
a) at iteration 0, initializing the precoding vector, w, to provide a precoding vector w(0) for iteration 0;
b) computing local-average Signal to Interference plus Noise Ratio, SINRs, of the at least one UE (506);
c) identifying a weakest UE from among the at least one UE (506) based on the computed local-average SINRs;

d) at iteration n+1, updating the precoding vector, w, based on the long-term CSI obtained from the at least one UE (506) for the weakest UE to thereby provide a precoding vector w(n+1) for iteration n+1;

e) normalizing the precoding vector w(n+1) for iteration n+1; and f) repeating steps (b) through (e) until a stopping criterion is satisfied (e.g., convergence or maximum number of iterations has been reached) such that the normalized precoding vector for the last iteration is provided as the precoding vector, w.

Embodiment 4: The method of embodiment 3 wherein initializing the precoding vector, w, comprises initializing the precoding vector, w, to a value $$w(0) = \frac{1}{\sqrt{M}}[1, \ldots, 1]^T.$$

Embodiment 5: The method of embodiment 3 or 4 wherein computing the local SINRs of the at least one UE (506) comprises computing the local SINRs of the at least one UE (506) as $\gamma_k = Pw^*\Theta_k w$, k=1, ..., K, by means of $\Theta_k$.

Embodiment 6: The method of embodiment 5 wherein identifying the weakest UE as the UE whose index k' is $$k' = \arg\min_{k=1,\ldots,K} \gamma_k.$$

Embodiment 7: The method of any one of embodiments 3 to 6 wherein updating the precoding vector, w, comprises updating the precoding vector, w, at iteration n+1 as w(n+1)=(I+μ$\Theta_k$)w(n).

Embodiment 8: The method of any one of embodiments 3 to 7 wherein normalizing the precoding vector w(n+1) for iteration n+1 comprises normalizing the precoding vector w(n+1) for iteration n+1 as w(n+1)=w(n+1)/‖w(n+1)‖.

Embodiment 9: The method of any one of embodiments 1 to 8 wherein the long-term CSI comprises estimated path loss.

Embodiment 10: The method of any one of embodiments 1 to 9 wherein a coherent interval of the long-term CSI spans greater than 1,000 symbols, and the method further comprises: at the central processing system (504), scheduling transmissions by the at least one UE (506) of a dedicated pilot; and at each AP (502-m) of the two or more APs (502-1, ..., 502-M), obtaining (904) the long-term CSI for the at least one UE (506) comprises estimating the long-term CSI for the at least one UE (506) in fixed intervals of time, based on the transmissions of the dedicated pilot.

Embodiment 11: A method performed at a central processing system (504) for a distributed cell-free massive MIMO network for broadcasting or multicasting data to User Equipments, UEs, comprising any one or more of the following actions:

for each Access Point, AP, (502-m) of two or more APs (502-1, ..., 502-M) in the distributed cell-free massive Multiple Input Multiple Output, MIMO, network, receiving (904) long-term Channel State Information, CSI, for at least one UE (506) from the AP (502-m);

computing (908) a precoding vector, w, for the at least one UE (506) across all of the two or more APs (502-1, ..., 502-M) based on the long-term CSI for the at least one UE (506) received from the two or more APs (502-1, ..., 502-M); and communicating (910) the precoding vector, w, to the two or more APs (502-1, ..., 502-M).

Embodiment 12: The method of embodiment 11 wherein the at least one UE (506) is two or more UEs (506-1, ..., 506-K).

Embodiment 13: The method of embodiment 11 or 12 wherein computing (908) the precoding vector, w, comprises:

a) at iteration 0, initializing the precoding vector, w, to provide a precoding vector w(0) for iteration 0;

b) computing local-average Signal to Interference plus Noise Ratios, SINRs, of the at least one UE (506);

c) identifying a weakest UE from among the at least one UE (506) based on the computed local-average SINRs;

d) at iteration n+1, updating the precoding vector, w, based on the long-term CSI obtained from the at least one UE (506) for the weakest UE to thereby provide a precoding vector w(n+1) for iteration n+1;

e) normalizing the precoding vector w(n+1) for iteration n+1; and f) repeating steps (b) through (e) until a stopping criterion is satisfied (e.g., convergence or maximum number of iterations has been reached) such that the normalized precoding vector for the last iteration is provided as the precoding vector, w.

Embodiment 14: The method of embodiment 13 wherein initializing the precoding vector, w, comprises initializing the precoding vector, w, to a value $$w(0) = \frac{1}{\sqrt{M}}[1, \ldots, 1]^T.$$

Embodiment 15: The method of embodiment 13 or 14 wherein computing the local SINRs of the at least one UE (506) comprises computing the local SINRs of the at least one UE (506) as $\gamma_k = Pw^*\Theta_k w$, k=1, ..., K, by means of $\Theta_k$.

Embodiment 16: The method of embodiment 15 wherein identifying the weakest UE as the UE whose index k' is $$k' = \arg\min_{k=1,\ldots,K} \gamma_k.$$

Embodiment 17: The method of any one of embodiments 13 to 16 wherein updating the precoding vector, w, comprises updating the precoding vector, w, at iteration n+1 as w(n+1)=(I+μ$\Theta_k$)w(n).

Embodiment 18: The method of any one of embodiments 13 to 17 wherein normalizing the precoding vector w(n+1) for iteration n+1 comprises normalizing the precoding vector w(n+1) for iteration n+1 as w(n+1)=w(n+1)/‖w(n+1)‖.

Embodiment 19: The method of any one of embodiments 11 to 18 wherein the long-term CSI comprises estimated path loss.

Embodiment 20: The method of any one of embodiments 11 to 19 wherein a coherent interval of the long-term CSI spans greater than 1,000 symbols, and the method further comprises scheduling transmissions by the at least one UE (506) of a dedicated pilot.

Embodiment 21: A method performed at an Access Point, AP, in a distributed cell-free massive Multiple Input Multiple Output, MIMO, network for broadcasting or multicasting data to User Equipments, UEs, the network comprising two or more APs, and the method comprising any one or more of the following actions:

obtaining (904) long-term Channel State Information, CSI, for at least one UE (506);

communicating (904) the long-term CSI for the at least one UE (506) to a central processing system (504);

obtaining (910) a precoding vector, w, from the central processing system (504), the precoding vector, w, being for the at least one UE (506) across all of two or more APs (502-1, . . . , 502-M);

precoding (912) data to be broadcast or multicast to the at least one UE (506) based on the precoding vector, w; and broadcasting or multicasting (912) the precoded data to the at least one UE (506).

Embodiment 22: The method of embodiment 21 wherein the at least one UE (506) is two or more UEs (506-1, . . . , 506-K).

Embodiment 23: The method of any one of embodiments 21 to 22 wherein the long-term CSI comprises estimated path loss.

Embodiment 24: The method of any one of embodiments 21 to 23 wherein a coherent interval of the long-term CSI spans greater than 1,000 symbols, and obtaining (904) the long-term CSI for the at least one UE (506) comprises estimating the long-term CSI for the at least one UE (506) in fixed intervals of time, based on transmissions of a dedicated pilot by the at least one UE (506).

Embodiment 25: A central processing system for a distributed cell-free massive Multiple Input Multiple Output, MIMO, network for broadcasting or multicasting data to User Equipments, UEs, wherein the central processing system is adapted to perform the method of any one of embodiments 11 to 20.

Embodiment 26: The central processing system of embodiment 25 comprising: a network interface; and processing circuitry associated with the network interface, the processing circuitry configured to cause the central processing system to perform the method of any one of embodiments 11 to 20.

Embodiment 27: An Access Point, AP, for a distributed cell-free massive Multiple Input Multiple Output, MIMO, network for broadcasting or multicasting data to User Equipments, UEs, the distributed cell-free massive MIMO network comprising two or more APs, and the AP adapted to perform the method of any one of embodiments 21 to 24.

Embodiment 28: The AP of embodiment 27 comprising: a network interface; at least one transmitter; at least one receiver; and processing circuitry associated with the network interface, the at least one transmitter, and the at least one receiver, wherein the processing circuitry is configured to cause the AP to perform the method of any one of embodiments 21 to 24.

Embodiment 29: A distributed cell-free massive Multiple Input Multiple Output, MIMO, network comprising at least two Access Points, APs, at least one User Equipment, UE, and a Central Processing Unit, CPU. Each AP obtains long-term Channel State Information, CSI, (e.g., based on filtering or processing of uplink measurements) which are communicated to the CPU, where an (e.g., iterative) optimization is performed to compute the precoding vector across all the at least two APs. Each AP then broadcasts a precoded multicast transmission to the at least one UE requiring the same content.

Embodiment 30: The method in the previous embodiment, where the statistical channel information between Access Points, APs, and User Equipments, UEs, consists of estimated path losses. By leveraging the signals transmitted and received during initial access (i.e., before Radio Resource Control, RRC, connection establishment), AP estimates the long-term Channel State Information, CSI, with respect to the UEs within the coverage region. For instance, each UE transmits a Physical Random Access Channel, PRACH, preamble in the uplink, which could be used to estimate the link average Signal to Noise Ratio, SNR, equivalently, the long-term channel gain between the AP and the UE.

Embodiment 31: Since the large-scale channel coherent interval spans over several thousands of symbols, in some embodiments, a network could schedule a dedicated pilot in the uplink and estimate the long-term Channel State Information, CSI, reliably in fixed intervals of time.

Embodiment 32: The method of any of the previous embodiments, further comprising: obtaining user data; and forwarding the user data to a host computer or a wireless device.

Group B Embodiments

Embodiment 33: A central processing system (504) for a distributed cell-free massive Multiple Input Multiple Output, MIMO, network for broadcasting or multicasting data to User Equipments, UEs, comprising: processing circuitry configured to perform any of the steps performed by the central processing system in any of the Group A embodiments; and power supply circuitry configured to supply power.

Embodiment 34: A communication system including a host computer comprising: processing circuitry configured to provide user data; and a communication interface configured to forward the user data to a cellular network for transmission to a User Equipment, UE; wherein the communication system comprises a central processing system (504) for a distributed cell-free massive Multiple Input Multiple Output, MIMO, network for broadcasting or multicasting data to UEs, the central processing system having a network interface and processing circuitry, the central processing system's processing circuitry configured to perform any of the steps performed by the central processing system in any of the Group A embodiments.

Embodiment 35: The communication system of the previous embodiment further including the central processing system.

Embodiment 36: The communication system of the previous 2 embodiments, further including the UE, wherein the UE is configured to communicate with at least one Access Point, AP, of the distributed cell-free massive MIMO network.

Embodiment 37: The communication system of the previous 3 embodiments, wherein: the processing circuitry of the host computer is configured to execute a host application, thereby providing the user data; and the UE comprises processing circuitry configured to execute a client application associated with the host application.

Embodiment 38: A method implemented in a communication system including a host computer, a base station, and a User Equipment, UE, the method comprising: at the host computer, providing user data; and at the host computer, initiating a transmission carrying the user data to the UE via a cellular network comprising a central processing system (504) for a distributed cell-free massive Multiple Input Multiple Output, MIMO, network for broadcasting or multicasting data to UEs, wherein the central processing system (504) performs any of the steps performed by the central processing system in of any of the Group A embodiments.

Embodiment 39: The method of the previous embodiment, further comprising, at one or more Access Points, APs, of the distributed cell-free massive MIMO network, transmitting the user data.

Embodiment 40: The method of the previous 2 embodiments, wherein the user data is provided at the host computer by executing a host application, the method further comprising, at the UE, executing a client application associated with the host application.

Embodiment 41: A User Equipment, UE, configured to communicate with a base station, the UE comprising a radio interface and processing circuitry configured to perform the method of the previous 3 embodiments.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
4G Fourth Generation
5G Fifth Generation
AP Access Point
APU Antenna Processing Unit
ASIC Application Specific Integrated Circuit
BS Base Station
CDF Cumulative Probability Distribution Function
C-maMIMO Centralized Massive Multiple Input Multiple Output
CPU Central Processing Unit
CSI Channel State Information
dB Decibel
D-maMIMO Distributed Massive Multiple Input Multiple Output
DSP Digital Signal Processor
eNB Enhanced or Evolved Node B
FDD Frequency Division Duplexing
FPGA Field Programmable Gate Array
GHz Gigahertz
gNB New Radio Base Station
km Kilometer
LED Light Emitting Diode
LTE Long Term Evolution
m Meter
MAC Medium Access Control
MBMS Multimedia Broadcast Multicast Service
MBSFN Multimedia Broadcast Multicast Service Single Frequency Network
MIMO Multiple Input Multiple Output
MME Mobility Management Entity
MTC Machine Type Communication
NR New Radio
OTT Over-the-Top
PDSCH Physical Downlink Shared Channel
P-GW Packet Data Network Gateway
PRACH Physical Random Access Channel
RAM Random Access Memory
RAN Radio Access Network
ROM Read Only Memory
RRC Radio Resource Control
SAR Specific Absorption Rate
SCEF Service Capability Exposure Function
SC-PTM Single Cell Point to Multipoint
SFN Single Frequency Network
SINR Signal to Interference plus Noise Ratio
SNR Signal to Noise Ratio
TDD Time Division Duplexing
UE User Equipment Those skilled in the art will recognize improvements and modifications to the embodiments of the present disclosure. All such improvements and modifications are considered within the scope of the concepts disclosed herein.

What is claimed is:

1. A method for broadcasting or multicasting data to User Equipments (UEs) in a distributed cell-free massive Multiple Input Multiple Output (MIMO) network, the method comprising:
   at each Access Point, AP, of two or more APs:
      obtaining long-term Channel State Information (CSI) for at least one UE; and
      communicating the long-term CSI for the at least one UE to a central processing system;
   at the central processing system:
      for each AP of the two or more APs, receiving the long-term CSI for the at least one UE from the AP;
      computing a precoding vector, w, for the at least one UE across the two or more APs based on the long-term CSI for the at least one UE received from the two or more APs, wherein the precoding vector, w, is computed by computing local-average Signal to Interference plus Noise Ratios (SINRs) of the at least one UE; and
      communicating the precoding vector, w, to the two or more APs; and
   at each AP of the two or more APs:
      obtaining the precoding vector, w, from the central processing system;
      precoding data to be broadcast or multicast to the at least one UE based on the precoding vector, w; and
      broadcasting or multicasting the precoded data to the at least one UE.

2. A method performed at a central processing system for a distributed cell-free massive Multiple Input Multiple Output (MIMO) network for broadcasting or multicasting data to User Equipments (UEs), the method comprising:
   for each Access Point (AP) of two or more APs in the distributed cell-free massive MIMO network, receiving long-term Channel State Information (CSI) for at least one UE from the AP;
   computing a precoding vector, w, for the at least one UE across all of the two or more APs based on the long-term CSI for the at least one UE received from the two or more APs, wherein the precoding vector, w, is computed by computing local-average Signal to Interference plus Noise Ratios (SINRs) of the at least one UE; and
   communicating the precoding vector, w, to the two or more APs.

3. The method of claim 2, wherein the at least one UE is two or more UEs.

4. The method of claim 2, wherein computing the precoding vector, w, comprises:
   (a) at iteration 0, initializing the precoding vector, w, to provide a precoding vector w(0) for iteration 0;
   (b) identifying a weakest UE from among a set of UEs that includes the at least one UE based on the computed local-average SINRs;
   (c) at iteration n+1, updating the precoding vector, w, based on the long-term CSI obtained from the at least one UE for the weakest UE to thereby provide a precoding vector w(n+1) for iteration n+1;
   (d) normalizing the precoding vector w(n+1) for iteration n+1; and repeating steps (a) through (d) until a stopping criterion is satisfied in a manner that the normalized precoding vector for the last iteration is provided as the precoding vector, w.

5. The method of claim 4, wherein the stopping criterion is convergence or maximum number of iterations has been reached.

6. The method of claim 4, wherein normalizing the precoding vector w(n+1) for iteration n+1 comprises normalizing the precoding vector w(n+1) for iteration $$n+1 \text{ as } \frac{w(n+1)}{\|w(n+1)\|}.$$

7. The method of claim 2, wherein the long-term CSI comprises estimated path loss.

8. The method of claim 2, wherein a coherent interval of the long-term CSI spans at least 1,000 symbols, and the method further comprises:
scheduling transmissions by the at least one UE of a dedicated pilot.

9. A central processing system for a distributed cell-free massive Multiple Input Multiple Output (MIMO) network for broadcasting or multicasting data to User Equipments (UEs), the central processing system comprising:
a network interface; and
processing circuitry associated with the network interface, the processing circuitry configured to cause the central processing system to:
for each Access Point (AP) of two or more APs in the distributed cell-free MIMO network, receive long-term Channel State Information (CSI) for at least one UE from the AP;
compute a precoding vector, w, for the at least one UE across all of the two or more APs based on the long-term CSI for the at least one UE received from the two or more APs, wherein the precoding vector, w, is computed by computing local-average Signal to Interference plus Noise Ratios (SINRs) of the at least one UE; and
communicate the precoding vector, w, to the two or more APs.

10. A method performed at an Access Point (AP) in a distributed cell-free massive Multiple Input Multiple Output (MIMO) network for broadcasting or multicasting data to User Equipments (UEs) the network comprising two or more APs, the method comprising:
obtaining long-term Channel State Information (CSI) for at least one UE;
communicating the long-term CSI for the at least one UE to a central processing system;
obtaining a precoding vector, w, from the central processing system, the precoding vector, w, being for the at least one UE across all of two or more APs, wherein the precoding vector, w, is computed by:
computing local-average Signal to Interference plus Noise Ratios (SINRs) of the at least one UE; and
identifying a weakest UE from among a set of UEs that includes the at least one UE based on the computed local-average SINRs;
precoding data to be broadcast or multicast to the at least one UE based on the precoding vector, w; and
broadcasting or multicasting the precoded data to the at least one UE.

11. The method of claim 10, wherein the at least one UE is two or more UEs.

12. The method of claim 10, wherein the long-term CSI comprises estimated path loss.

13. The method of claim 10, wherein a coherent interval of the long-term CSI spans at least 1,000 symbols, and
obtaining the long-term CSI for the at least one UE comprises estimating the long-term CSI for the at least one UE in fixed intervals of time, based on transmissions of a dedicated pilot by the at least one UE.

14. An Access Point (AP) for a distributed cell-free massive Multiple Input Multiple Output (MIMO) network for broadcasting or multicasting data to User Equipments (UEs), wherein the distributed cell-free massive MIMO network comprises two or more APs, the AP comprising:
a network interface;
at least one transmitter;
at least one receiver; and
processing circuitry associated with the network interface, the at least one transmitter, and the at least one receiver, wherein the processing circuitry is configured to cause the AP to:
obtain long-term Channel State Information (CSI) for at least one UE;
communicate the long-term CSI for the at least one UE to a central processing system; and
obtain a precoding vector, w, from the central processing system, the precoding vector, w, being for the at least one UE across all of two or more APs, wherein the precoding vector, w, is computed by:
computing local-average Signal to Interference plus Noise Ratios (SINRs) of the at least one UE;
identifying a weakest UE from among a set of UEs that includes the at least one UE based on the computed local-average SINRs;
precode data to be broadcast or multicast to the at least one UE based on the precoding vector, w; and
broadcast or multicast the precoded data to the at least one UE.

* * * * *